(12) United States Patent
Wolk et al.

(10) Patent No.: US 9,304,243 B2
(45) Date of Patent: Apr. 5, 2016

(54) ILLUMINATION DEVICE HAVING VISCOELASTIC LIGHTGUIDE

(71) Applicant: 3M INNOVATIVE PROPERTIES COMPANY, St. Paul, MN (US)

(72) Inventors: Martin B. Wolk, Woodbury, MN (US); Michael J. Sykora, New Richmond, WI (US); Robert L. Brott, Woodbury, MN (US); William J. Bryan, Mahtomedi, MN (US); Erik A. Aho, North St. Paul, MN (US); Martin Kristoffersen, Porsgrunn (NO); Michael A. Meis, Stillwater, MN (US); Kevin R. Schaffer, Woodbury, MN (US); Audrey A. Sherman, Woodbury, MN (US); John C. Schultz, Afton, MN (US); Mieczyslaw H. Mazurek, Roseville, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 0 days.

(21) Appl. No.: 14/823,124

(22) Filed: Aug. 11, 2015

(65) Prior Publication Data

US 2015/0346416 A1 Dec. 3, 2015

Related U.S. Application Data

(63) Continuation of application No. 13/522,074, filed as application No. PCT/US2011/021140 on Jan. 13, 2011, now Pat. No. 9,146,342.

(60) Provisional application No. 61/294,671, filed on Jan. 13, 2010.

(51) Int. Cl.
F21V 8/00 (2006.01)

(52) U.S. Cl.
CPC ............ *G02B 6/0043* (2013.01); *G02B 6/0065* (2013.01); *G02B 6/0066* (2013.01)

(58) Field of Classification Search
CPC .... G02B 6/005; G02B 6/0043; G02B 6/0065; G02B 6/0066
USPC .................... 362/217.15, 606, 607
See application file for complete search history.

(56) References Cited

U.S. PATENT DOCUMENTS 5,825,543 A 10/1998 Ouderkirk
5,828,488 A 10/1998 Ouderkirk
(Continued)

FOREIGN PATENT DOCUMENTS

EP 2 020 614 2/2009
JP 2004-271568 9/2004
(Continued)

OTHER PUBLICATIONS

Capodagli, "Isothermal viscoelastic properties of PMMA and LDPE over 11 decades of frequency and time: a test of time-temperature superposition", RHEOL ACTA, 2008, vol. 47, No. 7, Jun. 13, 2008, pp. 777-786, XP019628716.
(Continued)

*Primary Examiner* — David V Bruce
(74) *Attorney, Agent, or Firm* — Clifton F. Richardson

(57) ABSTRACT

An illumination device, such as a backlight for electronic display devices, is disclosed. The illumination device includes a viscoelastic lightguide optically coupled to a light source, and a nanovoided polymeric layer is used in conjunction with the lightguide to manage light emitted by the light source. The viscoelastic lightguide may be a pressure sensitive adhesive.

26 Claims, 15 Drawing Sheets

(56) References Cited

U.S. PATENT DOCUMENTS

| | | |
|---|---|---|
| 5,867,316 A | 2/1999 | Carlson |
| 5,882,774 A | 3/1999 | Jonza |
| 6,117,530 A | 9/2000 | Jonza |
| 6,179,948 B1 | 1/2001 | Merrill |
| 6,288,172 B1 | 9/2001 | Goetz |
| 6,352,761 B1 | 3/2002 | Hebrink |
| 6,368,699 B1 | 4/2002 | Gilbert |
| 6,827,886 B2 | 12/2004 | Neavin |
| 6,927,900 B2 | 8/2005 | Liu |
| 6,972,813 B1 | 12/2005 | Toyooka |
| 6,991,695 B2 | 1/2006 | Tait |
| 7,165,959 B2 | 1/2007 | Humlicek |
| 7,224,529 B2 | 5/2007 | King |
| 7,453,636 B2 | 11/2008 | Yeo |
| 7,479,404 B2 | 1/2009 | Cunningham |
| 7,481,563 B2 | 1/2009 | David |
| 2003/0118807 A1 | 6/2003 | Laney |
| 2004/0042233 A1 | 3/2004 | Suzuki |
| 2005/0052750 A1 | 3/2005 | King |
| 2005/0276071 A1 | 12/2005 | Sasagawa |
| 2006/0056166 A1 | 3/2006 | Yeo |
| 2006/0084780 A1 | 4/2006 | Hebrink |
| 2006/0216524 A1 | 9/2006 | Klun |
| 2006/0226561 A1 | 10/2006 | Merrill |
| 2007/0026167 A1 | 2/2007 | Bourdelais |
| 2007/0047080 A1 | 3/2007 | Stover |
| 2007/0201246 A1 | 8/2007 | Yeo |
| 2008/0032052 A1 | 2/2008 | Kourtakis |
| 2008/0084518 A1 | 4/2008 | Brott |
| 2009/0154141 A1 | 6/2009 | Hsiao |
| 2011/0176325 A1 | 7/2011 | Sherman |
| 2013/0011608 A1 | 1/2013 | Wolk |
| 2014/0132883 A1 | 5/2014 | Roberts |
| 2015/0192728 A1* | 7/2015 | Thompson ........... G02B 6/0043 362/624 |

FOREIGN PATENT DOCUMENTS

| | | |
|---|---|---|
| JP | 2004-325958 | 11/2004 |
| JP | 2008-003243 | 1/2008 |
| JP | 2009-081089 | 4/2009 |
| WO | 95-17691 | 6/1995 |
| WO | 95-17692 | 6/1995 |
| WO | 95-17699 | 6/1995 |
| WO | 96-19347 | 6/1996 |
| WO | 99-36248 | 7/1999 |
| WO | 03-027568 | 4/2003 |
| WO | 2006-026743 | 3/2006 |
| WO | 2006-098958 | 9/2006 |
| WO | 2008-045200 | 4/2008 |
| WO | 2008-127738 | 10/2008 |
| WO | 2009-011684 | 1/2009 |
| WO | 2009-054553 | 4/2009 |
| WO | 2011-088216 | 7/2011 |

OTHER PUBLICATIONS

Muto, "Electrical Control of Laser Beam in Viscoelastic Polymer Thin-Film Waveguide", Electronics and Communications in Japan, Part 2, vol. 73, No. 3, 1990, pp. 92-97.

"Viscoelasticity", Wikipedia, Apr. 3, 2011, Retrieved from the Internet: URL <http://en.wikipedia.org/wiki/Viscoelasticity> [retrieved on Apr. 11, 2011], 9 pages, XP-002632358.

* cited by examiner

ILLUMINATION DEVICE HAVING VISCOELASTIC LIGHTGUIDE

FIELD

This disclosure relates to illumination devices, particularly illumination devices that can be used as backlight assemblies in electronic display devices.

BACKGROUND

Electronic display devices, such as liquid crystal display (LCD) devices, are used in a variety of applications including computer monitors, televisions, hand-held devices, digital still cameras, and video cameras. In a typical LCD device, an LCD panel is backlit by one or more linear or point light sources which are optically coupled to the panel such that images are generated. Light sources can be optically coupled to an LCD panel using an arrangement of optical substrates or films including a lightguide, diffuser films, brightness enhancing films films, multilayer optical films and the like. LCD devices are often manufactured using a backlight assembly including one or more light sources optically coupled to a suitably designed arrangement of optical films, both of which are contained in a housing that can be joined with an LCD panel.

SUMMARY

An illumination device is disclosed herein. In some embodiments, the illumination device comprises: an optical article comprising a viscoelastic lightguide, and a nanovoided polymeric layer disposed on the viscoelastic lightguide, the nanovoided polymeric layer comprising a plurality of the interconnected nanovoids; and a light source optically coupled to the viscoelastic lightguide such that light emitted by the light source enters the viscoelastic lightguide and is transported within the lightguide by total internal reflection. The viscoelastic lightguide may comprise a pressure sensitive adhesive.

In some embodiments, the illumination device comprises: an optical article comprising: a nanovoided polymeric layer disposed between a viscoelastic lightguide and a substrate, the nanovoided polymeric layer comprising a plurality of the interconnected nanovoids, a first interface formed between the nanovoided polymeric layer and the viscoelastic lightguide, the first interface comprising a plurality of first features, and a second interface formed between the nanovoided polymeric layer and the substrate, the second interface comprising a plurality of second features; and a light source optically coupled to the viscoelastic lightguide such that light emitted by the light source enters the viscoelastic lightguide and is transported within the lightguide by total internal reflection.

In some embodiments, the illumination device comprises: an optical article comprising a viscoelastic lightguide disposed between a substrate and a nanovoided polymeric layer, the nanovoided polymeric layer comprising a plurality of the interconnected nanovoids; and a light source optically coupled to the viscoelastic lightguide such that light emitted by the light source enters the viscoelastic lightguide and is transported within the lightguide by total internal reflection.

In some embodiments, the illumination device comprises: an optical article comprising a viscoelastic lightguide disposed on a nanovoided polymeric layer, the nanovoided polymeric layer comprising a plurality of interconnected nanovoids, the interface formed between the viscoelastic lightguide and the nanovoided polymeric layer comprising a plurality of first features, and a surface of the viscoelastic lightguide opposing the interface comprising a plurality of second features; and a light source optically coupled to the viscoelastic lightguide such that light emitted by the light source enters the viscoelastic lightguide and is transported within the lightguide by total internal reflection.

In some embodiments, the illumination device comprises: an optical article comprising a viscoelastic lightguide disposed between first and second nanovoided polymeric layers, the first nanovoided polymeric layer comprising a plurality of first interconnected nanovoids, the second nanovoided polymeric layer comprising a plurality of second interconnected nanovoids, a first interface formed between the viscoelastic lightguide and the first nanovoided polymeric layer comprising a plurality of first features, and a second interface formed between the viscoelastic lightguide and the second nanovoided polymeric layer comprising a plurality of second features; and a light source optically coupled to the viscoelastic lightguide such that light emitted by the light source enters the viscoelastic lightguide and is transported within the lightguide by total internal reflection.

In some embodiments, the illumination device comprises: an optical article comprising a viscoelastic lightguide disposed between first and second nanovoided polymeric layers, the first nanovoided polymeric layer comprising a plurality of first interconnected nanovoids, the second nanovoided polymeric layer comprising a plurality of second interconnected nanovoids, a first interface formed between the viscoelastic lightguide and the first nanovoided polymeric layer comprising a plurality of first features that extract light being transported within the viscoelastic lightguide, and a second interface formed between the viscoelastic lightguide and the second nanovoided polymeric layer comprising a plurality of second features that reflect light being transported within the viscoelastic lightguide, and a substrate disposed on the first nanovoided layer opposite the viscoelastic lightguide, a third interface formed between the first nanovoided layer and the substrate comprising an array of linear prisms, and a surface of the substrate opposing the third interface comprising an array of cylindrical lenses; and a light source optically coupled to the viscoelastic lightguide such that light emitted by the light source enters the viscoelastic lightguide and is transported within the lightguide by total internal reflection.

In some embodiments, the illumination device comprises: an optical article comprising a viscoelastic lightguide comprising a viscoelastic layer and an adhesive layer, and a nanovoided polymeric layer disposed on the adhesive layer opposite the viscoelastic lightguide, the nanovoided polymeric layer comprising a plurality of the interconnected nanovoids; and a light source optically coupled to the viscoelastic lightguide such that light emitted by the light source enters the viscoelastic lightguide and is transported within the lightguide by total internal reflection.

In some embodiments, the illumination device comprises: an optical article comprising a viscoelastic lightguide comprising a viscoelastic layer disposed between first and second adhesive layers, and a first nanovoided polymeric layer disposed on the first adhesive layer opposite the viscoelastic layer, the first nanovoided polymeric layer comprising a plurality of first interconnected nanovoids; and a light source optically coupled to the viscoelastic lightguide such that light emitted by the light source enters the viscoelastic lightguide and is transported within the lightguide by total internal reflection.

In some embodiments, the illumination device comprises: an optical article comprising a viscoelastic lightguide disposed on a nanovoided polymeric layer, the nanovoided polymeric layer comprising a plurality of interconnected nanovoids, a first interface formed between the viscoelastic lightguide and the nanovoided polymeric layer comprising a plurality of first features; and a light source optically coupled to the viscoelastic lightguide such that light emitted by the light source enters the viscoelastic lightguide and is transported within the lightguide by total internal reflection.

The illumination device can be used to provide an image, and it can be a sign or marking. The illumination device can also be used in electronic display devices.

These and other aspects of the invention are described in the detailed description below. In no event should the above summary be construed as a limitation on the claimed subject matter which is defined solely by the claims as set forth herein.

BRIEF DESCRIPTION OF DRAWINGS

Advantages and features of the invention may be more completely understood by consideration of the following figures in connection with the detailed description provided below. The figures are schematic drawings of various articles and are not necessarily drawn to scale.

DETAILED DESCRIPTION

Figure 1A:
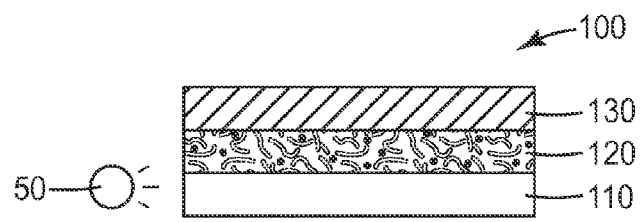
FIGS. 1a and 1b show embodiments of the illumination device disclosed herein.

This disclosure relates to U.S. Provisional Application Nos. 61/294,671 (Wolk et al.); 61/294,610 (Wolk et al.); 61/294,600 (Wolk et al.); and 61/294577 (Wolk et al.), all filed on Jan. 13, 2010, the disclosures of which are incorporated by reference in their entirety herein. This disclosure also relates to WO 2010/005655 A2 (Sherman et al.) the disclosure of which is incorporated by reference in their entirety herein.

In the following description, reference is made to the accompanying set of drawings that form a part hereof and in which are shown by way of illustration several specific embodiments. It is to be understood that other embodiments are contemplated and may be made without departing from the scope or spirit of the present disclosure. The following detailed description, therefore, is not to be taken in a limiting sense.

This invention describes high angle backlights (HABLs) comprising microreplicated low index materials and optically clear adhesives. HABLs are an integral part of temporally multiplexed 3D LCD displays based on 3M™ 3D film. Described are structured lightguides in which one or both major surfaces have structural optical elements such as lenses, prisms, or other extraction features. The geometry of the extraction features on the bottom surface and lenses on the top surface of an HABL is designed so that light injected into one side of the guide is emitted from the top surface at a prescribed angle (usually 70° with 90% of the energy within ±10°) into the half-hemispheres above the guide opposite the injection side. Several embodiments are described including a number of alternative constructions. A proposed article comprises: a viscoelastic solid of low haze and high transparency with two major surfaces (a viscoelastic lightguide), a low index nanofoam having an engineered microstructured surface (a nanovoided polymeric layer), wherein at least one major surface of the viscoelastic solid body is coincident with the structured surface of the low index nanofoam, and a light source is configured to inject light into the viscoelastic solid body.

Also described are processes that may be employed to fabricate HABLs. HABLs are typically constructed by adhering two microreplicated films to the major surfaces of a solid lightguide slab of clear acrylic. The adhesion of the structured films is accomplished using either a UV-curable optically clear resin syrup or an optically clear transfer adhesive.

A proposed process comprises: providing at least one support film; microreplicating a low index nanofoam on the support film; laminating the structured nanofoam film to a viscoelastic material to form a light guiding assembly (optical article); and configuring the assembly to distribute light from an array of point sources injected into the right and left sides of the assembly across the major surface of the assembly such that light injected from the right side exits predominantly into the left half-hemisphere above the major surface and light injected from the left side exits predominantly into the right half-hemisphere above the major surface.

A series of structured lightguides assemblies based on optically clear adhesives (OCAs) and microstructured low index materials in which the OCAs are molded against the low index structures. In some embodiments such as those shown in FIGS. 12a and 12b, the adhesive acts as the primary lightguide body. However, a case in which adhesive-filled optics are bonded to a solid guide is presented.

The proposed backlight composite assemblies integrate films and functions that are currently separate. The constructions of the proposed backlight composite assemblies are simpler, so their fabrication may be cost effective. Finally, the embedded optical structures of the assembly may result in improved durability of the backlights.

Figure 1B:
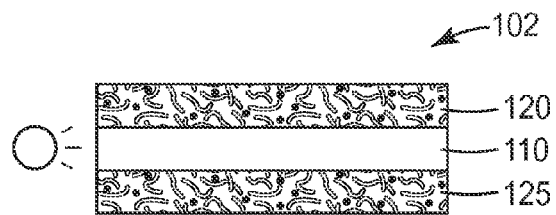

FIGS. 1a and 1b show embodiments of the illumination device disclosed herein. In FIG. 1a, illumination device 100 comprises light source 50 optically coupled to viscoelastic lightguide 110, and nanovoided polymeric layer 120 disposed on the lightguide. Support 130 is disposed on the nanovoided polymeric layer and is an optional component of the device. The viscoelastic lightguide and nanovoided polymeric layer are referred to herein as an optical article. In FIG. 1b, illumination device 102 comprises second nanovoided polymeric layer 125 disposed on the lightguide opposite nanovoided layer 120.

Viscoelastic Lightguide

The illumination device disclosed herein comprises a lightguide wherein light emitted by one or more light sources, enters the lightguide, and propagates, reflects, and/or refracts according to the law of refraction and the principle of total internal reflection. The behavior of light within the lightguide may depend on a variety of factors such as the surface structure of the lightguide, the presence (or absence) of additional substrate(s) in contact with the lightguide, and/or the material compositions of the lightguide and any additional substrate(s) in contact with the lightguide. In addition, the behavior of light within the lightguide may depend on the angular distribution of light that enters the lightguide.

The behavior of light with respect to the illumination devices disclosed herein can be described using principles of geometric optics. These principles are well known and are not presented here; a more detailed description can be found in the Sherman et al. references cited above. In general, one may apply the law of refraction and the principle of total internal reflection in conjunction with ray tracing techniques to determine theoretically how varying three dimensional structure, material composition, layer construction, angular distribution of light, etc. can affect the behavior of light for the illumination devices and articles disclosed herein.

The lightguide may have a refractive index greater than about 0.01, greater than about 0.1, or greater than about 0.5. When an optical article for managing light, such as an extractor as described in WO 2010/005655 A2 (Sherman et al.), is disposed adjacent the lightguide, the refractive index difference between the lightguide and the optical article may be from about 0.002 to about 0.5, from about 0.02 to about 0.5, from about 0.05 to about 0.5, from about 0.1 to about 0.5, or from about 0.4 to about 0.5. The extractor may comprise any type of article that can be optically coupled to the lightguide. The extractor is typically selected according to the intended use of the illumination device.

The lightguide may have any bulk three-dimensional shape as is needed for a given application. The lightguide may be in the form of a square or rectangular layer, sheet, film, etc. The lightguide may be cut or divided into shapes as described below.

The thickness of the lightguide is not particularly limited as long as it can function as desired. The thickness of the lightguide may be selected based on or in conjunction with the light source. Exemplary thicknesses for the lightguide range from about 0.4 mil to about 1000 mil, from about 1 mil to about 300 mil, from about 1 mil to about 60 mil, or from about 0.5 mil to about 30 mil.

The amount and direction of light extracted from the lightguide may be controlled, at the very least, by the shape, size, number, arrangement, etc. of the features, the refractive indices of the lightguide and any medium with which the lightguide is in contact, the shape and size of the lightguide, and the angular distribution of light that is allowed to enter the lightguide. These variables may be selected such that from about 10 to about 50%, from about 20 to about 50%, from about 30 to about 50%, from about 50 to about 70%, from about 50 to about 80%, or from about 10 to about 90% of light is extracted from the lightguide relative to the total amount of light that enters the lightguide.

In some embodiments, the lightguide is a viscoelastic lightguide as described in WO 2010/005655 A2 (Sherman et al.). In general, the viscoelastic lightguide comprises one or more viscoelastic materials which exhibit both elastic and viscous behavior when undergoing deformation. Elastic characteristics refer to the ability of a material to return to its original shape after a transient load is removed. One measure of elasticity for a material is referred to as the tensile set value which is a function of the elongation remaining after the material has been stretched and subsequently allowed to recover (destretch) under the same conditions by which it was stretched. If a material has a tensile set value of 0%, then it has returned to its original length upon relaxation, whereas if the tensile set value is 100%, then the material is twice its original length upon relaxation. Tensile set values may be measured using ASTM D412. Useful viscoelastic materials may have tensile set values of greater than about 10%, greater than about 30%, or greater than about 50%; or from about 5 to about 70%, from about 10 to about 70%, from about 30 to about 70%, or from about 10 to about 60%.

Viscous materials that are Newtonian liquids have viscous characteristics that obey Newton's law which states that stress increases linearly with shear gradient. A liquid does not recover its shape as the shear gradient is removed. Viscous characteristics of useful viscoelastic materials include flowability of the material under reasonable temperatures such that the material does not decompose.

The viscoelastic lightguide may have properties that facilitate sufficient contact or wetting with at least a portion of a material designed to extract light from the lightguide, e.g., an optical article, such that the viscoelastic lightguide and the optical article are optically coupled. Light can then be extracted from the viscoelastic lightguide. The viscoelastic lightguide is generally soft, compliant and flexible. Thus, the viscoelastic lightguide may have an elastic modulus (or storage modulus G') such that sufficient contact can be obtained, and a viscous modulus (or loss modulus G") such that the layer doesn't flow undesirably, and a damping coefficient (G"/G', tan D) for the relative degree of damping of the layer. Useful viscoelastic materials may have a storage modulus, G', of less than about 300,000 Pa, measured at 10 rad/sec and a temperature of from about 20 to about 22° C. Viscoelastic properties of materials can be measured using Dynamic Mechanical Analysis according to, for example, ASTM D4065, D4440, and D5279.

In some embodiments, the viscoelastic lightguide comprises a PSA layer as described in the Dalquist criterion line (as described in Handbook of Pressure Sensitive Adhesive Technology, Second Ed., D. Satas, ed., Van Nostrand Reinhold, New York, 1989.)

The viscoelastic lightguide may have a particular peel force or at least exhibit a peel force within a particular range. For example, the viscoelastic lightguide may have a 90° peel force of from about 50 to about 3000 On, from about 300 to about 3000 On, or from about 500 to about 3000 Win. Peel force may be measured using a peel tester from IMASS.

In some embodiments, the viscoelastic lightguide comprises an optically clear lightguide having high light transmittance of from about 80 to about 100%, from about 90 to about 100%, from about 95 to about 100%, or from about 98 to about 100% over at least a portion of the visible light spectrum (about 400 to about 700 nm). In some embodiments, the viscoelastic lightguide has a haze value of less than about 5%, less than about 3%, or less than about 1%. In some embodiments, the viscoelastic lightguide has a haze value of from about 0.01 to less than about 5%, from about 0.01 to less than about 3%, or from about 0.01 to less than about 1%. Haze values in transmission can be determined using a haze meter according to ASTM D1003.

In some embodiments, the viscoelastic lightguide comprises an optically clear lightguide having high light transmittance and a low haze value. High light transmittance may be from about 90 to about 100%, from about 95 to about 100%, or from about 99 to about 100% over at least a portion of the visible light spectrum (about 400 to about 700 nm), and haze values may be from about 0.01 to less than about 5%, from about 0.01 to less than about 3%, or from about 0.01 to less than about 1%. The viscoelastic lightguide may also have a light transmittance of from about 50 to about 100%.

In some embodiments, the viscoelastic lightguide is hazy and diffuses light, particularly visible light. A hazy viscoelastic lightguide may have a haze value of greater than about 5%, greater than about 20%, or greater than about 50%. A hazy viscoelastic lightguide may have a haze value of from about 5 to about 90%, from about 5 to about 50%, or from about 20 to about 50%.

In some embodiments, the viscoelastic lightguide may be translucent in that it reflects and transmits light.

The viscoelastic lightguide may have a refractive index in the range of from about 1.3 to about 2.6, 1.4 to about 1.7, or from about 1.5 to about 1.7. The particular refractive index or range of refractive indices selected for the viscoelastic lightguide may depend on the overall design of the illumination device and the particular application in which the device may be used.

The viscoelastic lightguide generally comprises at least one polymer. The viscoelastic lightguide may comprise at least one PSA. PSAs are useful for adhering together adherends and exhibit properties such as: (1) aggressive and permanent tack, (2) adherence with no more than finger pressure, (3) sufficient ability to hold onto an adherend, and (4) sufficient cohesive strength to be cleanly removable from the adherend. Materials that have been found to function well as pressure sensitive adhesives are polymers designed and formulated to exhibit the requisite viscoelastic properties resulting in a desired balance of tack, peel adhesion, and shear holding power. Obtaining the proper balance of properties is not a simple process. A quantitative description of PSAs can be found in the Dahlquist reference cited above.

Useful PSAs are described in detailed in the Sherman et al. references cited above. Useful PSAs include poly(meth)acrylate PSAs derived from: monomer A comprising at least one monoethylenically unsaturated alkyl (meth)acrylate monomer, wherein a homopolymer of the monomer has a Tg of no greater than about 0° C.; and monomer B comprising at least one monoethylenically unsaturated free-radically copolymerizable reinforcing monomer, wherein a homopolymer of the monomer has a Tg higher than that of monomer A, for example, at least about 10° C. As used herein, (meth)acrylic refers to both acrylic and methacrylic species and likewise for (meth)acrylate.

In some embodiments, the viscoelastic lightguide comprises natural rubber-based and synthetic rubber-based PSAs, thermoplastic elastomers, tackified thermoplastic-epoxy derivatives, polyurethane derivatives, polyurethane acrylate derivatives, silicone PSAs such as polydiorganosiloxanes, polydiorganosiloxane polyoxamides and silicone urea block copolymers.

In some embodiments, the viscoelastic lightguide comprises a clear acrylic PSA, for example, those available as transfer tapes such as VHB™ Acrylic Tape 4910F from 3M Company and 3M™ Optically Clear Laminating Adhesives (8140 and 8180 series).

In some embodiments, the viscoelastic lightguide comprises a block copolymer dispersed in an adhesive matrix to form a Lewis acid-base pair. In some embodiments, the viscoelastic lightguide comprises a stretch releasable PSA that can be removed from a substrate when stretched at or nearly at a zero degree angle.

The viscoelastic lightguide can optionally include one or more additives such as filler, particles, fibers, bubbles, plasticizers, chain transfer agents, initiators, antioxidants, stabilizers, fire retardants, viscosity modifying agents, foaming agents, antistats, colorants such as dyes and pigments, fluorescent dyes and pigments, phosphorescent dyes and pigments, fibrous reinforcing agents, and woven and non-woven fabrics.

Nanovoided Polymeric Layer

The illumination device disclosed herein comprises a nanovoided polymeric layer as described in U.S. Provisional Appl. No. 61/294,610 (Wolk et al.; filed Jan. 13, 2010) and references cited therein. In general, the nanovoided polymeric layer comprises a low refractive index layer that can be used in place of air when disposed between two substrates. The nanovoided polymeric layer comprises a polymeric solid network or matrix that at least partially surrounds nanopores or nanovoids. The nanovoided polymeric layer can also be described as having a plurality of interconnected nanovoids or a network of nanovoids dispersed in a binder. The nanovoided polymeric layer can be porous having nanovoids at the surface and within the layer. At least some of the nanovoids in the plurality or network are connected to one another via hollow tunnels or hollow tunnel-like passages.

The nanovoided polymeric layer can comprise multiple pluralities of interconnected nanovoids or multiple networks of nanovoids where the nanovoids in each plurality or network are interconnected. In some cases, in addition to multiple pluralities of interconnected nanovoids, the nanovoided polymeric layer can include a plurality of closed or unconnected nanovoids meaning that the nanovoids are not connected to other nanovoids via tunnels.

In general, the nanovoids can have any suitable diameter or be in a range of diameter. For example, in some cases, at least a majority of the nanovoids, such as at least 60% or 70% or 80% or 90% or 95% of the nanovoids, have a size that is in a desired range. For example, in some cases, at least a majority of the nanovoids, such as at least 60% or 70% or 80% or 90% or 95% of the nanovoids, have a size less than about any one of the following in um: 10, 7, 5, 4, 3, 2, 1, 0.7 and 0.5. The size and distribution of diameters can be controlled by choosing suitable composition and fabrication, such as coating, drying and curing conditions as described in U.S. Provisional Appl. No. 61/294,610 (Wolk et al.) and references cited therein.

In some cases, some of the nanovoids can be sufficiently small so that their primary optical effect is to reduce the effective index of refraction, and/or sufficiently large so that the nanovoided polymeric layer scatters light. When the nanovoided polymeric layer is sufficiently thick, and the nanovoids are sufficiently small, the layer can have an effective permittivity, $\epsilon_{eff}$, as defined by Equation 1, and an effective index, $n_{\mathit{eff1}}$, as defined by Equation 2. In some cases, such as when the difference between the refractive indices of the nanovoids and the binder is sufficiently small, the nanovoided polymeric layer can have an effective index, $n_{\mathit{eff2}}$, as defined by Equation 3.

$$\epsilon_{\mathit{eff}} = f\epsilon_v + (1-f)\epsilon_b \quad (1)$$

$$n_{\mathit{eff1}}^2 = fn_v^2 + (1-f)n_b^2 \quad (2)$$

$$n_{\mathit{eff2}} = fn_v + (1-f)n_b \quad (3)$$

For a nanovoided polymeric layer having an effective index as defined by Equation 3, the effective index of the nanovoided microstructured layer is the volume weighted average of the indices of refraction of the nanovoids and the binder. For example, a nanovoided polymeric layer having a nanovoid volume fraction of about 50% and comprising a binder having an index of refraction of about 1.5 can have an effective index of refraction of about 1.25. In some embodiments, the nanovoided polymeric layer has an effective index of refraction from about 1.15 to about 1.45, or from about 1.2 to 1.4.

In general, the nanovoided polymeric layer can have any porosity or void volume fraction depending on the intended use of the illumination device. In some cases, the volume fraction of plurality of voids in the layer is not less than about 10%, or not less than about 20%, or not less than about 30%, or not less than about 40%, or not less than about 50%, or not less than about 60%, or not less than about 70%, or not less than about 80%, or not less than about 90%.

In some embodiments, the nanovoided polymeric layer is sufficiently thick so that the layer can have an effective index of refraction that can be expressed in terms of the indices of refraction of the nanovoids and the binder, and the nanovoid or pore volume fraction or porosity. In such cases, the thickness of the nanovoided polymeric layer is from about 1 to about 500 um, or from about 1 to about 1000 um.

The binder or polymeric material used in the nanovoided layer is not particularly limited and is typically formed from monomers during formation of the layer. That is, the binder is made from a polymerizable coating material (as described below). The binder can be made from monomers polymerized by conventional means such as those that are chemically and/or thermally initiated, as well as initiated by visible, UV and e-beam radiation. Exemplary polymerizable materials include low molecular weight materials (less than 500 g/mol), oligomers (500 to 10,000 g/mol) and polymers (greater than 10,000 g/mol).

Exemplary polymerizable materials are described in detail in Wolk et al. Polymerizable materials include those having ethylenically unsaturated compounds such as styrenes and (meth)acrylates (acrylates and methacrylates), and other materials such as epoxy-functionalized materials, isocyanates, and silicone- and fluoro-containing materials. Combinations of polymerizable materials may be used, and cross linking agents may be employed such that the resulting binder in the nanovoided polymeric layer is crosslinked.

The nanovoids can be free of all matter and/or particulates. In some embodiments, nanovoids may include one or more small fiber- or string-like objects such as binder and/or nanoparticles. In general, suitable nanoparticles can have any diameter or be in a range of diameters, but particularly from about 3 to about 1000 nm, from about 3 to about 500 nm, from about 3 to about 100 nm, or from about 3 to about 50 nm. In some embodiments, at least a majority of the nanoparticles, such as at least 60% or 70% or 80% or 90% or 95% of the nanoparticles, have a size that is in a desired range. In some embodiments, particles can be aggregates of nanoparticles that have a large aspect ratio. The maximum cross-sectional dimension of the aggregates can be within any of the aforementioned ranges. Exemplary nanoparticles in the form of aggregates include "fumed" nanoparticles, such as fumed silica and fumed alumina, with diameter less than about 50 nm, for example, CAB-O-SPERSE products available from Cabot Co.

In some cases, the nanoparticles can be sufficiently small so that their primary optical effect is to alter the index of refraction, and/or sufficiently large so that the layer scatters light. For example, incorporation of high refractive index nanoparticles such as zirconia (n=2.2) and titania (n=2.7) can be incorporated into the nanovoided polymeric layer such that the index of refraction is increased from about 1.4 to about 2.0.

The nanoparticles can be inorganic nanoparticles, organic (e.g., polymeric) nanoparticles, or a combination of inorganic and organic nanoparticles. In one particular embodiment, nanoparticles can be porous particles, hollow particles, solid particles, or a combination thereof. Examples of suitable inorganic nanoparticles include silica and metal oxides such as zirconia, titania, ceria, alumina, iron oxide, vanadia, antimony oxide, tin oxide, alumina/silica, silica/zirconia and combinations thereof. The nanoparticles can be provided in the form of a colloidal dispersion. Metal oxides can be found under the product designation NALCO from Nalco Chemical Co.; IPA and MA sols from Nissan Chemical America Co.; and SNOWTEX, also from Nissan Chemical America Co.

In some embodiments, the nanoparticles are not surface-modified. In some embodiments, the nanoparticles are surface-modified. The nanoparticles can be surface-modified to increase compatibility in the formulation from which the layer is formed. The nanoparticles can also be surface-modified such that they bond to the binder chemically and/or physically. In the former case, the surface-modified nanoparticles have functionality that chemically reacts with the binder. In general, surface modification can be carried out with surface-modifying agents such that the nanoparticles have hydrophobic and/or hydrophilic surfaces. Surface-modifying agents include silanes, organic acids and organic bases. Methods for surface-modifying nanoparticles are described in U.S. Provisional Appl. No. 61/294,610 (Wolk et al.) and references cited therein. In some embodiments, the nanoparticles comprise silica that has been surface-modified with a silane such as SILQUEST silanes available from GE Silicones.

The weight ratio of binder or polymerizable material to nanoparticles can range from about 30:70, 40:60, 50:50, 55:45, 60:40, 70:30, 80:20 or 90:10 or more depending on the desired properties of the nanovoided polymeric layer. The preferred ranges of wt % of nanoparticles range from about 10% by weight to about 60% by weight, and can depend on the density and size of the nanoparticle used.

The nanovoided polymeric layer can be prepared as described in U.S. Provisional Appl. No. 61/294,610 (Wolk et al.; filed Jan. 13, 2010) and references cited therein. In general, the nanovoided polymeric layer is formed by coating a solvent-containing polymeric or pre-polymeric solution on a substrate, followed by evaporation of the solvent under controlled conditions. If the solution comprises pre-polymeric components (e.g. monomers), then the components can be polymerized by appropriate means before, during or after solvent is removed. The amount of solvent in the coating solution can correlate to the void volume formed in the nanovoided polymeric layer. Coating solutions typically comprise anywhere from 10 to about 70 wt. % solvent. Various processing and post-processing steps may be carried out in the manufacture of nanovoided polymeric layers as described in Wolk et al.

In some embodiments, as described below, the nanovoided polymeric layer is microstructured such that the layer has a plurality of surface relief features, each feature having at least one dimension of less than about 1 mm, less than about 500 um, or from about 50 nm to about 500 um. Nanovoided polymeric layers can be microstructured by contacting the coating solution with a microstructured tool before solvent is removed. If curing is needed, the solution can be cured while in contact with the tool. In general, when a microstructured tool is used, the solution can be coated on a substrate and then contacted with the tool, or the solution can be contacted with the tool followed by the substrate. Details describing these variations are provided in Wolk et al.

The nanovoided polymeric layer can be microstructured such that the surface is in the form of refractive elements, for example, prisms, lenticular lenses, Fresnel elements or cylindrical lenses, any of which can form a regular linear or 2D array, or an irregular, pseudorandom, serpentine pattern or random array. In some embodiments, the microstructured surface imparts retroreflectivity or partial retroreflectivity, for example, the surface can comprise cube corner elements, diffractive elements such as a linear or 2D grating, diffractive optical elements, or holographic elements. The particular microstructure can be selected depending on the desired properties of the illumination device and depends upon the properties of any adjacent layers.

Many different types of solvents may be used depending on the polymeric or monomeric components in the coating solution and the desired properties of the nanovoided polymeric layer. The solvent may or may not be a mixture of solvents. The solvent may be polar and/or non-polar, and high or low boiling. Exemplary solvents include hydrocarbons, alcohols, ketones, glycol ethers, esters and water. Addenda may also be included in the coating solution such as tackifiers, plasticizers, UV absorbers and the like.

The support used in the formation of the nanovoided polymeric layer is not particularly limited and may be selected depending on the particular manufacturing process used to make the layer. For example, the support used in the formation of the nanovoided layer may allow light to be transmitted through it in order to cure coating solution disposed on the opposing side of the support. Exemplary supports include polyesters such as PET, polycarbonates, acrylics and methacrylics. The support used in the formation of the nanovoided polymeric layer may or may not be part of the optical article. That is, after the nanovoided polymeric layer is formed, support 130 can be removed or it can remain in place such that it is incorporated as a component of the optical article. In this latter case, the support has optical properties suitable for the intended application, as described below for substrates. Any of the substrates described below can be used as a support for formation of the nanovoided polymeric layer.

The nanovoided polymeric layer has particular haze properties depending on the intended use of the illumination device. In some embodiments, the nanovoided polymeric layer has a low optical haze not greater than about 5%, or not greater than about 4%, or not greater than about 3.5%, or not greater than about 3%, or not greater than about 2.5%, or not greater than about 2%, or not greater than about 1.5%, or not greater than about 1%. In some embodiments, the nanovoided polymeric layer has a high optical haze not less than about 40%, or not less than about 50%, or not less than about 60%, or not less than about 70%, or not less than about 80%, or not less than about 90%, or not less than about 95%. For light normally incident on the nanovoided polymeric layer, optical haze is defined as the ratio of the transmitted light that deviates from the normal direction by more than 4 degrees to the total transmitted light. Index of refraction values can be measured using a Metricon Model 2010 Prism Coupler (available from Metricon Corp.). Optical transmittance, clarity and haze can be measured using a Haze-Gard Plus haze meter (available from BYK-Gardiner).

Light Source

The light source is optically coupled to the lightguide such that at least some of the light from the light source can enter the lightguide. For example, a light source may be optically coupled to the lightguide such that greater than 1, greater than 10, greater than 20, greater than 30, greater than 40, greater than 50, greater than 90%, or about 100% of light emitted by the light source enters the lightguide. For another example, a light source may be optically coupled to the lightguide such that from about 1 to about 10%, from about 1 to about 20%, from about 1 to about 30%, from about 1 to about 40%, from about 1 to about 50%, from about 1 to about 100%, from about 1 to about 100%, from about 50 to about 100%, or from about 1 to about 100% of light emitted by the light source enters the lightguide. The light source may emit light having a random or a particular angular distribution.

The light source may comprise any suitable light source. Exemplary light sources include linear light sources such as cold cathode fluorescent lamps and point light sources such as light emitting diode (LEDs). Exemplary light sources also include organic light-emitting devices (OLEDs), incandescent bulbs, fluorescent bulbs, halogen lamps, UV bulbs, infrared sources, near-infrared sources, lasers, or chemical light sources. In general, the light emitted by the light source may be visible or invisible. At least one light source may be used. For example, from 1 to about 10,000 light sources may be used. The light source may comprise a row of LEDs positioned at or near an edge of the lightguide. The light source may comprise LEDs arranged on a circuit such that light emitted from the LEDs lights up continuously or uniformly the lightguide throughout a desired area. The light source may comprise LEDs that emit light of different colors such that the colors can mix within the lightguide. In this way, a graphic (as described below) could be designed to appear differently at different times during its use.

Exemplary Illumination Devices

A variety of multilayer constructions comprising the viscoelastic lightguide and the nanovoided polymeric layer may be used in the illumination device, and the particular multilayer construction used in a device depends on the intended application. Some of these embodiments are described below.

Figure 2A:
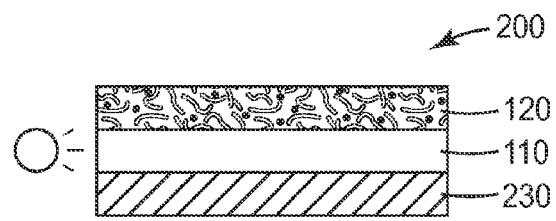
FIGS. 2a-2c show schematic cross sections of exemplary illumination devices wherein optical articles have an additional substrate.

FIG. 2a shows a schematic cross section of exemplary illumination device 200. Illumination device 200 comprises light source 50, viscoelastic lightguide 110 and nanovoided polymeric layer 120 as described for FIG. 1a. Illumination device 200 includes substrate 230 disposed on the lightguide opposite the nanovoided polymeric layer. A variety of substrates comprising different optical properties and chemistries can be used as substrate 230. Substrate 230 may have a refractive index in the range of from about 1.3 to about 2.6, 1.4 to about 1.7, or from about 1.5 to about 1.7. For example, substrate 230 may have a refractive index less than that of viscoelastic lightguide such that the substrate functions as a light containing substrate for light propagating within the lightguide. For a light containing substrate in contact with the viscoelastic lightguide, the amount of light extracted from the lightguide and by the substrate may be less than about 0.5%, less than about 1%, less than about 2%, less than about 5%, or less than about 10% relative to the total amount of light that enters the lightguide. In general, at least a portion of the interface between viscoelastic lightguide 110 and substrate 230 is optically smooth such that light propagating within viscoelastic lightguide is transported by total internal reflection.

In some embodiments, substrate 230 may have a refractive index greater than that of the viscoelastic lightguide such that the substrate functions as a light extracting substrate. For a light extracting substrate in contact with the viscoelastic lightguide, the amount of light extracted from the lightguide and by the substrate may be greater than about 10%, greater than about 20%, greater than about 30%, greater than about 40%, greater than about 50%, greater than about 60%, greater than about 70%, greater than about 80%, or greater than about 90% relative to the total amount of light that enters the lightguide. In some embodiments, substrate 230 may have the same or nearly the same refractive index as that of the viscoelastic lightguide. In both embodiments, at least a portion of the interface between viscoelastic lightguide 110 and substrate 230 is optically smooth such that light propagating within viscoelastic lightguide is transported by total internal reflection.

In some embodiments, substrate 230 comprises an optically clear substrate having high light transmittance of from about 80 to about 100%, from about 90 to about 100%, from about 95 to about 100%, or from about 98 to about 100% over at least a portion of the visible light spectrum. In some embodiments, substrate 230 has a haze value of less than about 5%, less than about 3%, or less than about 1%. In some embodiments, substrate 230 has a haze value of from about 0.01 to less than about 5%, from about 0.01 to less than about 3%, or from about 0.01 to less than about 1%.

In some embodiments, substrate 230 comprises an optically clear substrate having high light transmittance and a low haze value. High light transmittance may be from about 90 to about 100%, from about 95 to about 100%, or from about 98 to about 100% over at least a portion of the visible light spectrum, and haze values may be from about 0.01 to less than about 5%, from about 0.01 to less than about 3%, or from about 0.01 to less than about 1%. In some embodiments, substrate 230 is hazy and diffuses light, particularly visible light. A hazy substrate 230 may have a haze value of greater than about 5%, greater than about 20%, or greater than about 50%. A hazy substrate 230 may have a haze value of from about 5 to about 90%, from about 5 to about 50%, or from about 20 to about 50%.

In some embodiments, substrate 230 has low light transmittance, for example, from about 0.1 to about 70%, from about 0.1 to about 50%, or from about 0.1 to about 20%.

In some embodiments, substrate 230 may be translucent in that it reflects and transmits light.

In some embodiments, substrate 230 comprises one or more viscoelastic materials as described above for the viscoelastic lightguide. In some embodiments, substrate 230 comprises a PSA as described above for the viscoelastic lightguide. In some embodiments, substrate 230 and the viscoelastic lightguide comprise viscoelastic materials. In some embodiments, substrate 230 and the viscoelastic lightguide comprise PSAs.

In some embodiments, the viscoelastic lightguide comprises a clear acrylic PSA, and substrate 230 comprises a silicone PSA. The silicone PSA may comprise a stretch releasable PSA as described above. The refractive index of the clear acrylic PSA may be greater than that of the silicone PSA, e.g., the refractive index difference may be from about 0.04 to about 0.09. Exemplary clear acrylic PSAs are available as transfer tapes such as VHB™ Acrylic Tape 4910F from 3M Company and 3M™ Optically Clear Laminating Adhesives (8140 and 8180 series). Silicone PSAs include any of those described above such as the silicone PSAs comprising polydiorganosiloxane polyoxamide.

In some embodiments, substrate 230 comprises an adhesive that is useful for adhering the viscoelastic lightguide to another substrate. Useful adhesives include optically clear adhesives, optically diffuse adhesives, radiation cured adhesives, thermal cured adhesives, hot melt adhesives, cold seal adhesives, heat activated adhesives, adhesives that cure at room temperature and structural adhesives having an adhesive bond strength of at least about 6 MPa, and the like. Structural adhesives are available as 3M™ SCOTCH-WELD™ Adhesives.

In some embodiments, substrate 230 is not viscoelastic.

In some embodiments, substrate 230 comprises a polymeric film. Useful polymeric films include cellulose acetate, poly(meth)acrylate (acrylate and/or methacrylate), polyether sulfone, polyurethane, polyester, polycarbonate, polymethyl methacrylate, polyvinyl chloride, syndiotactic polystyrene, cyclic olefin copolymer, polyethylene terephthalate, polyethylene naphthalate, copolymer or blend based on naphthalene dicarboxylic acids, or some combination thereof. In some embodiments, substrate 230 comprises a poly(meth)acrylate having a refractive index greater than that of the viscoelastic lightguide.

Substrate 230 may be a reflector that reflects incident light being transported within the viscoelastic lightguide. In some embodiments, the reflector comprises a specular reflector wherein the reflection angle of light is within about 16° of the incident angle. Suitable specular reflectors include mirrors such as a plane mirrors comprising a film of reflecting material, typically a metal, coated on glass. Suitable reflectors include mirrors that are multilayer optical films. Useful multilayer optical films comprise films having from about 10 to about 10,000 alternating layers of first and second polymer layers wherein the polymer layers comprise polyesters. Exemplary multilayer optical films are described in U.S. Pat. Nos. 5,825,543; 5,828,488 (Ouderkirk et al.); U.S. Pat. Nos. 5,867,316; 5,882,774; 6,179,948 B1 (Merrill et al.); U.S. Pat. Nos. 6,352,761 B1; 6,368,699 B1; 6,927,900 B2; 6,827,886 (Neavin et al.); U.S. Pat. No. 6,972,813 B1 (Toyooka); U.S. Pat. No. 6,991,695; 2006/0084780 A1 (Hebrink et al.); 2006/0216524 A1; 2006/0226561 A1 (Merrill et al.); 2007/0047080 A1 (Stover et al.); WO 95/17303; WO 95/17691; WO 95/17692; WO 95/17699; WO 96/19347; WO 97/01440; WO 99/36248; and WO 99/36262.

Exemplary specular reflectors include those available from 3M™ Company, for example, 3M™ High Intensity Grade Reflective Products such as High Reflective Visible Mirror Film and High Transmission Mirror Film, and Vikuiti™ films such as Vikuiti™ Enhanced Specular Reflector.

In some embodiments, the reflector comprises a diffuse reflector wherein light propagating within the viscoelastic lightguide is reflected and scattered at a surface of the diffuse reflector. The diffuse reflector may comprise a layer of binder and organic, inorganic or hybrid organic/inorganic particles disposed on a substrate. The particles may have a diameter of from greater than about 0.01 to about 100 um and may be polymeric particles, microspheres, glass beads, inorganic particles, metal oxide particles, or hybrid organic/inorganic particles. The binder may comprise a PSA and/or be light transmissive. For example, the diffuse reflector may comprise a layer of barium sulfate particles loaded in a polyethylene terephalate film. Other constructions that provide a reflective surface are described in U.S. Pat. No. 7,481,563 (David et al.). Exemplary light diffusing materials are also described in U.S. Pat. No. 6,288,172 B1 (Goetz et al.).

In some embodiments, substrate 230 comprises a multilayer optical film. Multilayer optical films that are mirrors are described above. Other types of multilayer optical films may also be used, for example, the multilayer optical film may be a reflective film, a polarizer film, a reflective polarizer film, a diffuse blend reflective polarizer film, a diffuser film, a brightness enhancing film, a turning film, a mirror film, or a combination thereof. Exemplary multilayer optical films include 3M™ Vikuiti™ films available from 3M™ Company. Exemplary multilayer optical films are described in the references cited above for multilayer optical films that are mirrors.

In some embodiments, substrate 230 comprises a polymeric film, metal, glass, ceramic, paper, fabric, or a combination thereof. In some embodiments, substrate 230 comprises metal such as aluminum. In some embodiments, substrate 230 comprises glass which generally comprises a hard, brittle, amorphous solid, including, soda-lime glass, borosilicate glass, acrylic glass, sugar glass, and the like. In some embodiments, substrate 230 comprises a ceramic comprising some amount of crystalline structure and made, for example, from inorganic non-metallic materials. In some embodiments, substrate 230 comprises paper, for example, paper made from cellulose pulp. In some embodiments, substrate 230 comprises fabric, for example, leather, woven fabrics, non-woven fabrics.

In some embodiments, substrate 230 comprises a release liner. Release liners typically have a low adhesion surface for contact with an adhesive layer. Release liners may comprise paper such as Kraft paper, or polymeric films such as poly(vinyl chloride), polyester, polyolefin, cellulose acetate, ethylene vinyl acetate, polyurethane, and the like. The release liner may be coated with a layer of a release agent such as a silicone-containing material or a fluorocarbon-containing material. The release liner may comprise paper or a polymeric film coated with polyethylene which is coated with a silicone-containing material. Exemplary release liners include liners commercially available from CP Films Inc. under the trade designations "T-30" and "T-10" that have a silicone release coating on polyethylene terephthalate film.

Figure 2B:
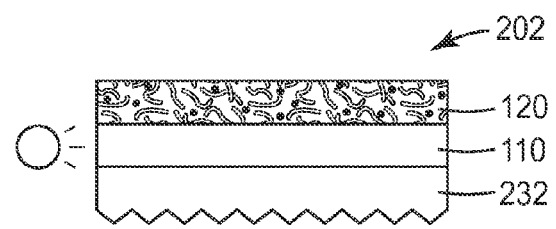
Figure 2C:
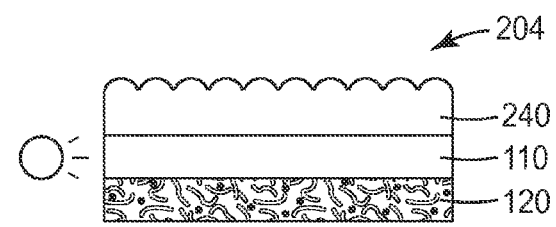

In some embodiments, substrate 230 may have a structured surface such that the optical article has an outer structured surface. FIG. 2b shows a schematic cross section of exemplary illumination device 202 comprising substrate 232 having an outer structured surface, for example, substrate 232 may comprise a prismatic film with an array of linear prisms such as 3M™ Vikuiti™ Brightness Enhancement Film available from 3M™ Company. FIG. 2c shows a schematic cross section of exemplary illumintion device 204 comprising substrate 240 having an outer structured surface, for example, the outer structured surface can be a lenticular surface with an array of cylindrical lenses for emitting light extracted from the lightguide.

Figure 3A:
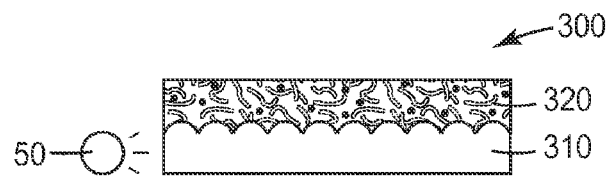
FIGS. 3a-3f show schematic cross sections of exemplary illumination devices wherein the viscoelastic lightguide comprises a structured surface.
Figure 3B:
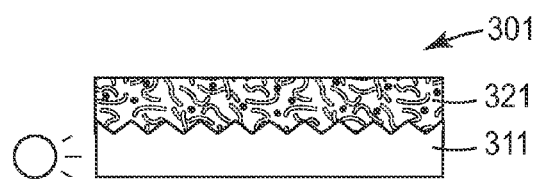
Figure 3C:
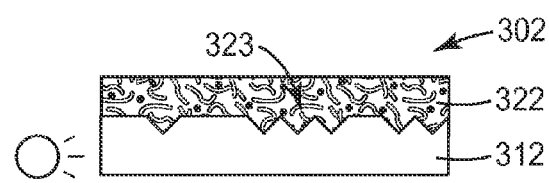

The optical article of the illumination device disclosed herein can have a structured interface formed by the viscoelastic lightguide and the nanovoided polymeric layer. FIGS. 3a and 3b, respectively, show schematic cross sections of exemplary illumination device 300 having a lenticular interface and exemplary illumination device 301 having a prismatic interface. The structured interface formed between the viscoelastic lightguide and the nanovoided polymeric layer may comprise features arranged in some particular way, in order to control or modify the behavior of light within the viscoelastic lightguide; FIG. 3c shows exemplary illumination device 302 wherein the interface formed between viscoelastic lightguide 312 and nanovoided polymeric layer 322 comprises features 323.

Figure 3D:
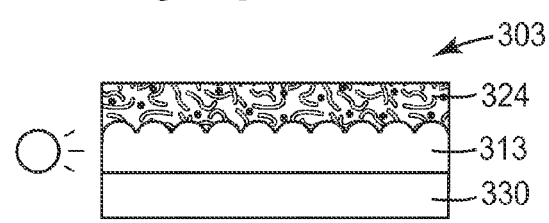
Figure 3E:
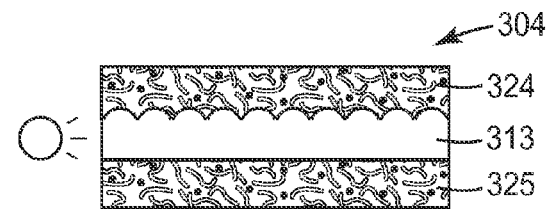
Figure 3F:
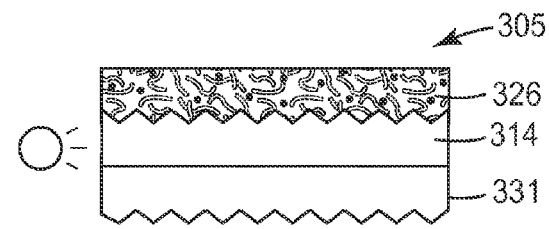

FIGS. 3d-3f show schematic cross sections of additional exemplary illumination devices wherein the optical articles have structured interfaces formed between the viscoelastic lightguide and the nanovoided polymeric layer. In FIG. 3d, the optical article comprises viscoelastic lightguide 313, nanovoided polymeric layer 324 and substrate 330 disposed on the lightguide opposite the nanovoided polymeric layer. Substrate 330 may comprise any of those described above for 230. In some embodiments, substrate 330 may comprise a second nanovoided polymeric layer as shown in FIG. 3e (substrate 325). In some embodiments, substrate 330 may comprise a structured surface such that the optical article has an outer structured surface as shown in FIG. 3f (substrate 331).

Figure 4:
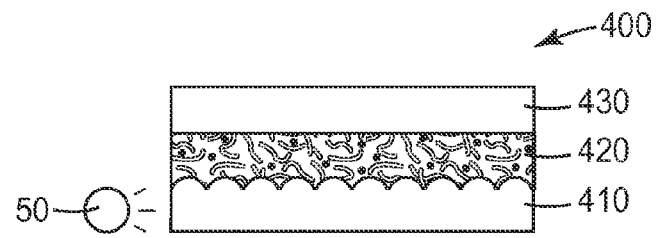
FIG. 4 shows a schematic cross section of an exemplary illumination device that provides an image.

FIG. 4 shows an embodiment in which illumination device 400 comprises an opticle article that provides an image. Disposed on viscoelastic lightguide 410 is nanovoided polymeric layer 420, and imaged substrate 430 is disposed on the nanovoided polymeric layer. The imaged substrate may comprise one or more materials such as particles in regions of the substrate wherein the regions are arranged to form an image. The regions may reflect light or transmit light within a particular range of wavelengths depending on the particular imaging materials. Colorants such as pigments and dyes may be used as the imaging materials. An image may be made by depositing material on the outer surface of substrate 430 or by depositing material between substrate 430 and the viscoelastic lightguide.

Figure 5A:
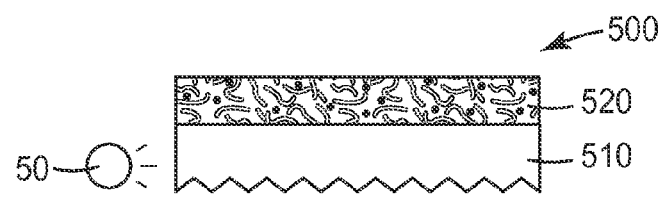
FIGS. 5a-5d and 6 show schematic cross sections of additional exemplary illumination devices wherein the viscoelastic lightguide comprises a structured surface(s).
Figure 5B:
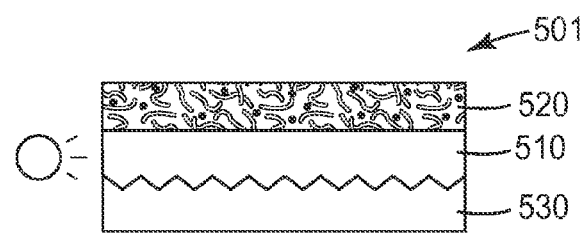
Figure 5C:
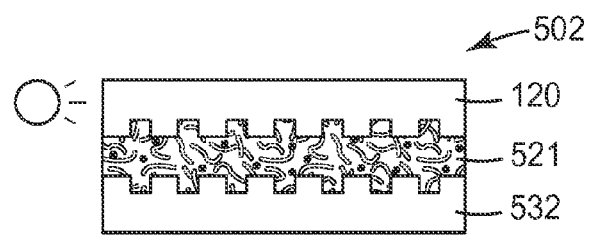
Figure 5D:
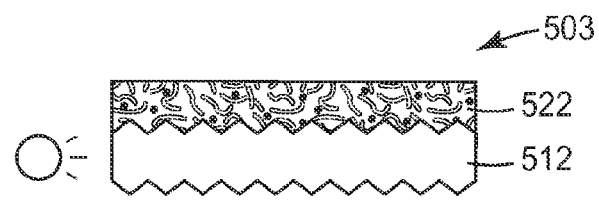

FIGS. 5a-5d show schematic cross sections of additional exemplary illumination devices wherein the viscoelastic lightguide comprises a structured surface(s). In FIG. 5a, the optical article of illumination device 500 comprises viscoelastic lightguide 510 and nanovoided polymeric layer 520 wherein the interface formed between the two is substantially planar and the viscoelastic lightguide has a structured surface opposite this interface. In FIG. 5b, the optical article of illumination device 501 comprises substrate 530 disposed on the lightguide opposite the nanovoided polymeric layer. Substrate 530 may comprise any of those described above for 230. In FIG. 5c, the optical article of illumination device 502 comprises nanovoided polymeric layer 521 disposed on viscoelastic lightguide 511 and substrate 531 is disposed on the nanovoided polymeric layer opposite the lightguide. In this embodiment, the nanovoided layer is disposed between two other layers, and both interfaces are structured. In FIG. 5d, illumination device 503 comprises viscoelastic lightguide with opposing structured surfaces, and nanovoided polymeric layer 522 disposed on one the surfaces.

Figure 6:
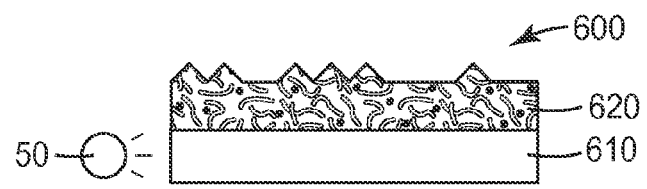

The interface formed between the viscoelastic lightguide and the nanovoided polymeric layer may be substantially planar, and a surface of the viscoelastic layer opposite this interface may be structured. For example, FIG. 6 shows exemplary illumination device 600 wherein the interface formed between viscoelastic lightguide 610 and nanovoided polymeric layer 620 is substantially planar and a surface of the lightguide opposite this interface is structured.

In general, the structured surfaces and interfaces described above for FIGS. 2a-2c, 3a-3f, 4, 5a-5d and 6 may comprise any three-dimensional structure depending on the desired effect. The structured surface typically comprises a plurality of features, for example, from about 1 to about 10, from about 1 to about 100, or from about 1 to about 2000 features. The features may comprise protrusions, depressions, or a combination thereof. Exemplary features comprise protrusions and/ or depressions having lenticular, prismatic, ellipsoidal, conical, parabolic, pyramidal, square, or rectangular shapes, or a combination thereof. Features comprising lenses are particularly useful for directing light to a preferred angular distribution. Exemplary features comprising linear prisms or elongated prisms are also particularly useful. Other exemplary features comprise protrusions and/or depressions having elongated, irregular, variably sloped lenticular, or random columnar shapes, or a combination thereof. Hybrids of any combination of shapes may be used, for example, elongated parabolic, pyramidal prismatic, rectangular-based prismatic, and rounded-tip prismatic shapes. The features may comprise random combinations of shapes.

Sizes of the features may be described by their overall shapes in three dimensions. In some embodiments, each feature may have a dimension of from about 1 to about 100 um, for example, from about 5 to about 70 um. The features may have all the same shape, but the sizes of the shapes may vary in at least one dimension. The features may have different shapes, and the sizes of these features may or may not vary in any given dimension.

The features may be randomly arranged, arranged in some type of regular pattern, or both. The distance between features may also vary. The features may be discreet or they may overlap. The features may be arranged in close proximity to one another, in substantial contact with each other, immediately adjacent each other, or some combination thereof. A useful distance between features is up to about 10 um, or from about 0.05 um to about 10 um. The features may be offset with respect to one another, angularly as well as transversely. The areal density of the features may change over the length, width, or both.

The features may be used to control the amount and/or direction of light extracted from the viscoelastic lightguide. This can be carried out generally by varying the shape, size, surface structure, and/or orientation of the features. If a plurality of features is used, then the number and/or arrangement of the features may be varied, as well as the orientation of the features relative to each other.

Figure 7A:
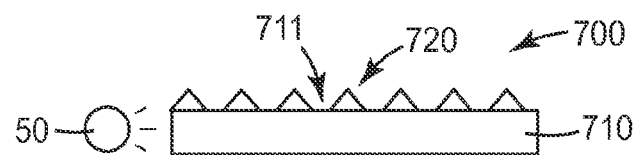
FIGS. 7a-7c, 8a, 8b and 9 show schematic views of exemplary illumination devices wherein the nanovoided polymeric layer is discontinuous.
Figure 7B:
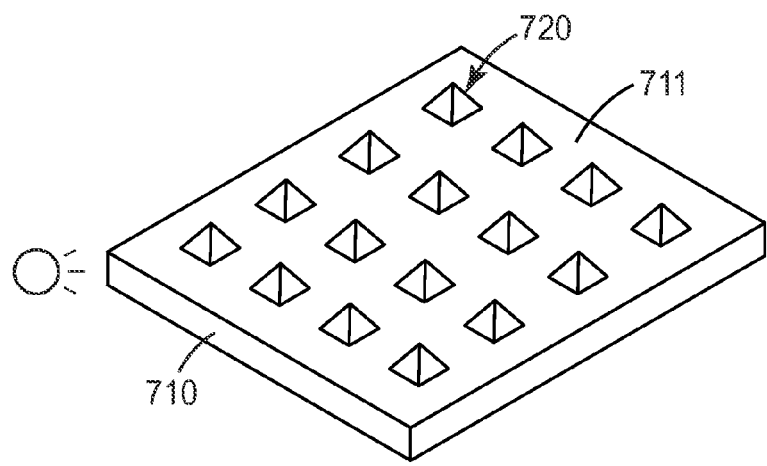
Figure 7C:

The optical article of the illumination device disclosed herein can comprise a nanovoided layer that is discontinuous. FIGS. 7a and 7b, respectively, show a schematic cross section and perspective view of exemplary illumination device 700 having an array of individual features 720 formed on surface 711 of viscoelastic layer 710, wherein the individual features comprise nanovoided polymeric material. FIG. 7c shows exemplary illumination device 701 wherein features 721, comprising nanovoided polymeric material, are arranged to form an image or pattern from light extracted from viscoelastic layer 710.

Figure 8A:
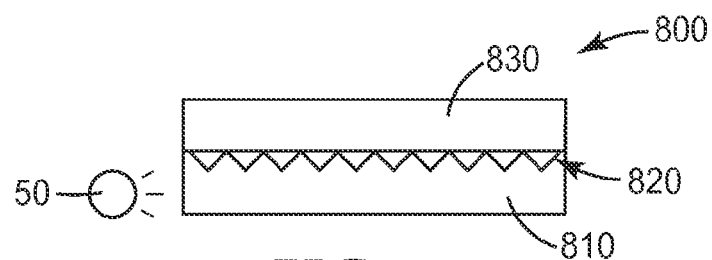
Figure 8B:
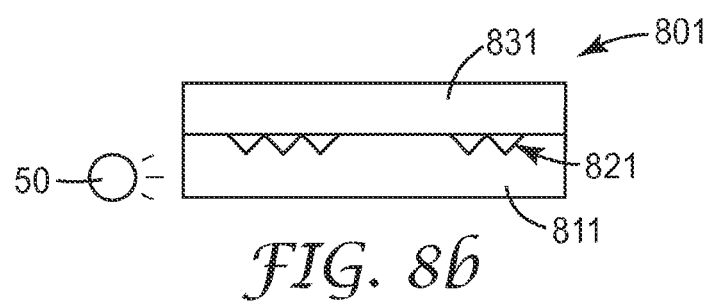

The optical article of the illumination device disclosed herein can comprise a nanovoided layer that is substantially discontinuous. FIG. 8a shows a schematic cross section of exemplary illumination device 800 having an array of features 820 formed between viscoelastic layer 810 and substrate 830, wherein the features comprise nanovoided polymeric material. FIG. 8b shows exemplary illumination device 701 wherein features 821, comprising nanovoided polymeric material, are arranged to form an image or pattern from light extracted from viscoelastic layer 811.

Figure 9:
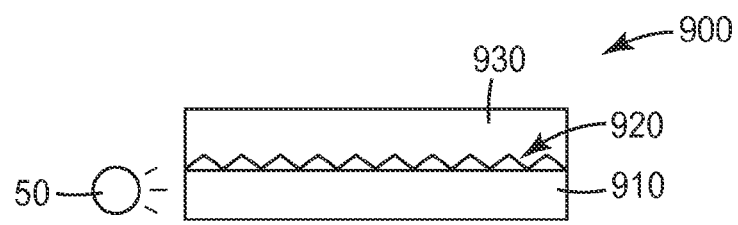

FIG. 9 shows a schematic cross section of an exemplary illumination device comprising a polymeric nanovoided layer that is substantially discontinuous. Illumination device 900 comprises an array of features 920 formed between viscoelastic layer 910 and substrate 930, wherein the features comprise nanovoided polymeric material.

Figure 10:
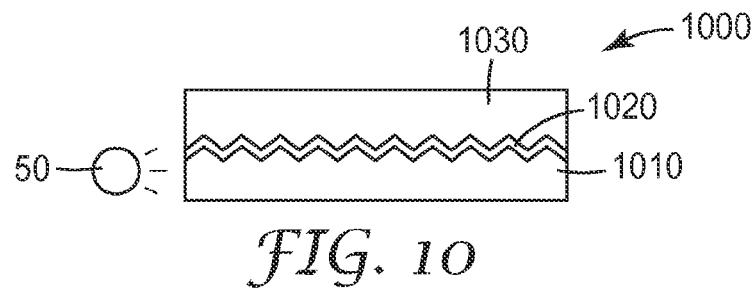
FIG. 10 shows a schematic cross section of an exemplary illumination device comprising a polymeric nanovoided layer that is nonplanar.

FIG. 10 shows a schematic cross section of an exemplary illumination device comprising a polymeric nanovoided layer that is nonplanar. Illumination device 1000 comprises nonplanar nanovoided polymeric layer 1020 comprising an array of features, the layer disposed between viscoelastic lightguide 1010 and substrate 1030. Surfaces of the viscoelastic lightguide and substrate substantiantially mate with each other, with nanovoided polymeric material disposed between the surfaces as layer 1020.

The illumination device disclosed herein may be used as part of an LCD device for displaying stereoscopic 3D images as described, for example, in US 2008/0084518 A1 (Brott et al.). An optical article used in this type of device is shown in the exploded perspective view of FIG. 11a with viscoelastic lightguide 1110 disposed between first and second substrates 1120 and 1130, respectively, with third substrate 1130 disposed on first substrate 1120 opposite the lightguide. The illumination device comprises right and left eye image solid state light sources (not shown) positioned at opposing edges of the viscoelastic lightguide. Each of the light sources (or sets of light sources) is optically coupled to the viscoelastic lightguide and both are electrically connected to a synchronization driving element as described in Brott et al. The illumination device provides right and left eye images to an LCD panel positioned above second substrate 1140.

Figure 11A:
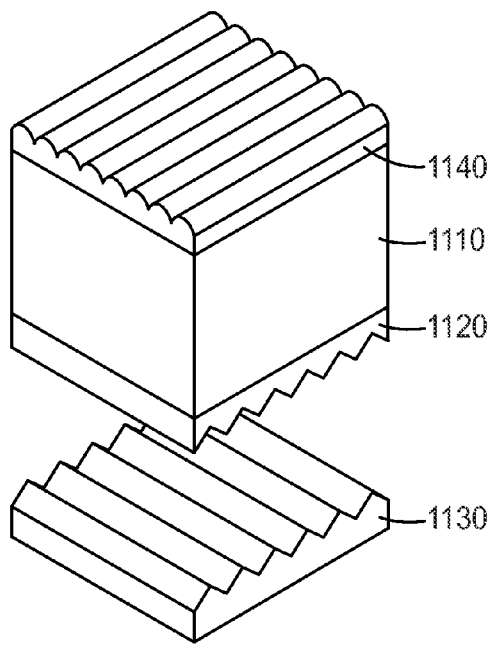
FIGS. 11a-11c show schematic views of an optical article suitable for used in an LCD device for displaying stereoscopic 3D images.
Figure 11B:
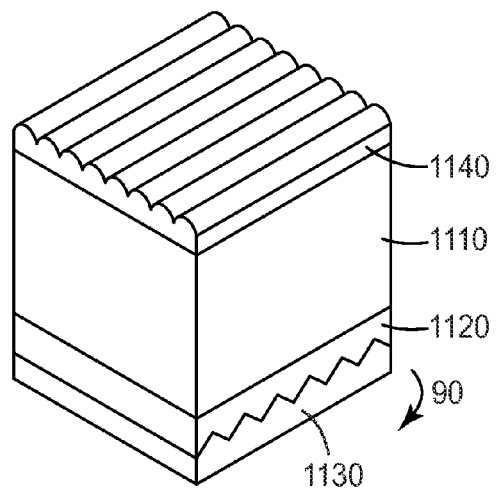

First substrate 1120 comprises an outer structured surface (facing third substrate 1130) that substantially re-directs (e.g., reflects, extracts, etc.) light. Third substrate 1130 is optional and can be used to provide a highly refective surface to assist re-directing light out through the outer structured surface of substrate 1140. The interface formed between the first and third substrates comprises an array of first linear features, for example, as shown in FIG. 11a, the first linear features may comprise elongated prisms. FIG. 11b shows a schematic perspective view of the optical article shown in FIG. 11a, with first and third substrates in contact.

Figure 11C:
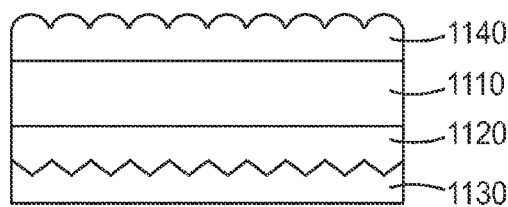

Second substrate 1140 comprises an outer structured surface that substantially emits light. This surface comprises an array of second linear features, for example, as shown in FIG. 11a, the second linear features may comprise elongated lenticular features. In many embodiments, the second linear features extend in a direction orthogonal to the first linear features, as can be seen in the perspective views of FIGS. 11a and 11b. FIG. 11c shows a cross section of the optical article shown in FIG. 11b wherein both the first and second linear features can be seen. This simplified view is used in FIGS. 12a-12b, 13a-13c and 14a-14f described below.

Figure 12A:
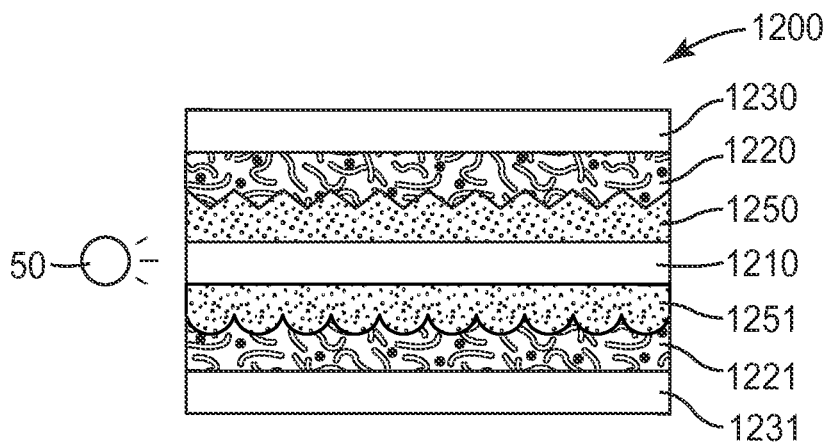
FIG. 12a shows a schematic cross section of an exemplary illumination device comprising two sets of linear features embedded in the optical article.

FIG. 12a shows a schematic cross section of an exemplary illumination device comprising two sets of linear features embedded in the optical article. Illumination device 1200 comprises light source 50 optically coupled to viscoelastic lightguide 1200. First and second nanovoided polymeric layers 1220 and 1221 are adhered to viscoelastic lightguide 1200 by first and second adhesive layers 1250 and 1251, respectively. First and second substrates 1230 and 1231 are disposed on the nanovoided polymeric layers opposite the corresponding adhesive layers. Exemplary embodiments include optically clear substrates as the first and second substrates, and an optically clear substrate as the first substrate and a multilayer optical film such as 3M™ ESR Film as the second substrate. Another exemplary embodiment includes an adhesive lightguide in place of the viscoelastic lightguide. Yet another exemplary embodiment includes a non-viscoelastic substrate in place of the viscoelastic lightguide.

Figure 12B:
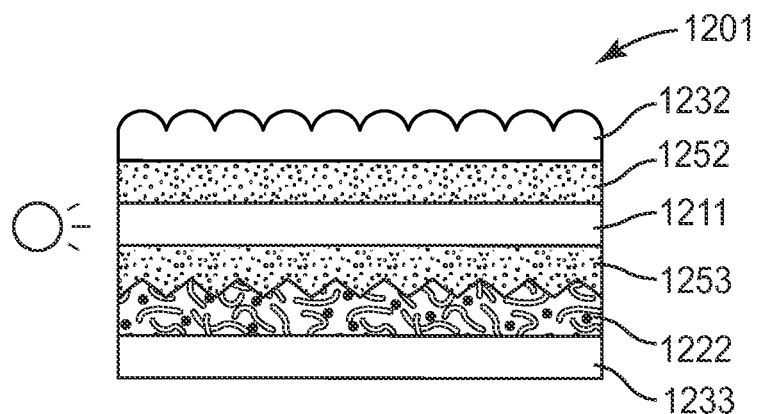
FIG. 12b shows a schematic cross section of an exemplary illumination device comprising two sets of linear features wherein one set of linear features is embedded in the optical article and one is not.

FIG. 12b shows a schematic cross section of an exemplary illumination device comprising two sets of linear features wherein one set of linear features is embedded in the optical article and one is not. Illumination device 1201 comprises light source 50 optically coupled to viscoelastic lightguide 1211. First substrate is an optically clear substrate and is adhered to the viscoelastic lightguide by first adhesive layer 1252. Nanovoided polymeric layer 1222 is adhered to viscoelastic lightguide 1211 by second adhesive layer 125, and second substrate 1233 is disposed on the nanovoided polymeric layer opposite the second adhesive layer. Exemplary embodiments include optically clear substrates as the first and second substrates, and an optically clear substrate as the first substrate and a multilayer optical film such as 3M™ ESR Film as the second substrate. Another exemplary embodiment includes an adhesive lightguide in place of the viscoelastic lightguide. Yet another exemplary embodiment includes a non-viscoelastic substrate in place of the viscoelastic lightguide.

Figure 13A:
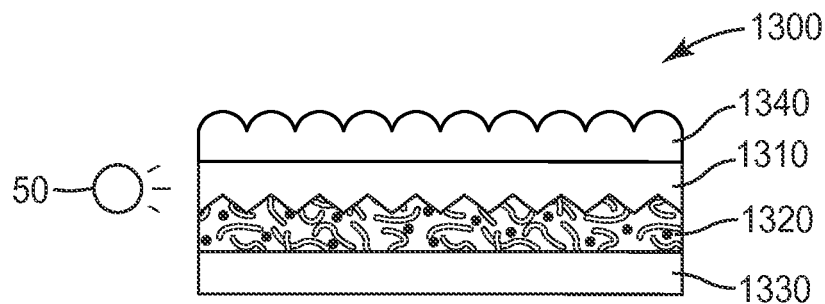
FIGS. 13a-13b show schematic cross sections of exemplary illumination devices, each device comprising two structured surfaces, wherein one structured surface is embedded in the optical article.

FIG. 13*a* shows a schematic cross section of an exemplary illumination device comprising two structured surfaces, wherein one structured surface is embedded in the optical article and formed at the interface between the viscoelastic layer and the nanovoided polymeric layer. Illumination device 1301 comprises light source 50 optically coupled to viscoelastic lightguide 1310 which is an adhesive lightguide. First substrate 1340 is an optically clear substrate and is adhered to adhesive lightguide 1310. Second substrate 1330 is adhered to adhesive lightguide 1310 with nanovoided polymeric layer 1320 disposed between the two. Exemplary embodiments include an optically clear substrate as the second substrate.

Figure 13B:
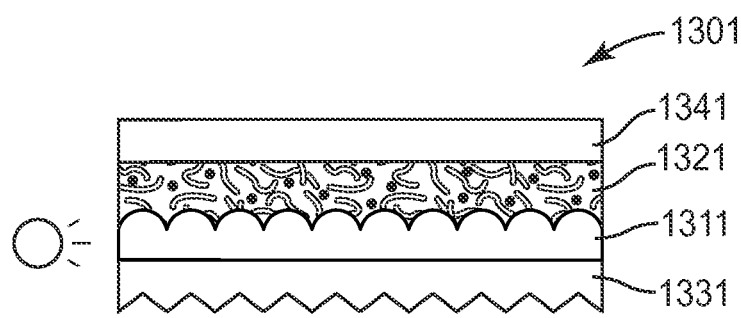

FIG. 13*b* shows a schematic cross section of an exemplary illumination device comprising two structured surfaces, wherein one structured surface is embedded in the optical article and formed at the interface between the viscoelastic layer and the nanovoided polymeric layer. Illumination device 1301 comprises light source 50 optically coupled to viscoelastic lightguide 1311 which is an adhesive lightguide. First substrate 1341 is an optically clear substrate and is adhered to adhesive lightguide 1311 with nanovoided polymeric layer 1321 disposed between the two. Second substrate 1331 is adhered to adhesive lightguide 1311. Exemplary embodiments include an optically clear substrate as the second substrate.

Figure 13C:
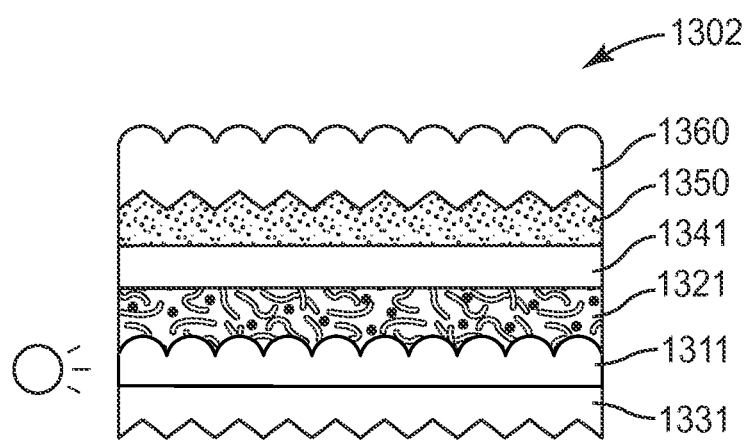
FIG. 13c shows a schematic cross sections of an exemplary illumination device, comprising four structured surfaces, wherein two structured surfaces are embedded in the optical article.

FIG. 13*c* shows a schematic cross sections of an exemplary illumination device, comprising four structured surfaces, wherein two structured surfaces are embedded in the optical article. Illumination device 1302 comprises double side prism film 1360 adhered to first substrate 1341 by adhesive layer 1350. Exemplary embodiments include an optically clear substrate as the second substrate. The double sided prism film comprises lenticular and prismatic features configured dependently such that the period of repetition or pitch P for each pair of features (lenticular and prismatic) is about the same or at least within about 100 um. For each pair of features, the curvature of the lenticular feature may be such that its focal point coincides with the vertex of the prismatic feature. Useful configurations of lenticular and prismatic features are described in U.S. 2005/0052750 A1 (King et al.) and U.S. 2005/0276071 (Sasagawa et al.).

FIGS. 14*a*-14*d* show schematic cross sections of exemplary illumination devices, each device comprising two sets of linear features formed at the interface between the viscoelastic lightguide and adjacent layers. Illumination device 1400 comprises light source 50 optically coupled to viscoelastic lightguide 1410 which is an adhesive lightguide and is adhered to nanovoided polymeric layer 1420. Illumination device 1401 comprises light source 50 optically coupled to viscoelastic lightguide 1411 which is an adhesive lightguide and is adhered to, and is disposed between, first and second nanovoided polymeric layers 1421 and 1422. Illumination device 1402 comprises light source 50 optically coupled to viscoelastic lightguide 1412 which is an adhesive lightguide and is adhered to optically clear substrate 1430 and nanovoided polymeric layer 1422. Illumination device 1403 comprises light source 50 optically coupled to viscoelastic lightguide 1413 which is an adhesive lightguide and is adhered to nanovoided polymeric layer 1421 and substrate 1431.

Figure 14A:
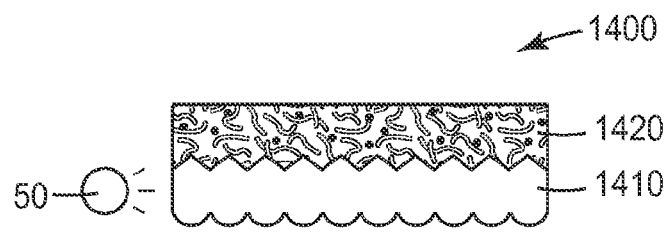
FIGS. 14a-14f show schematic cross sections of exemplary illumination devices, each device comprising two sets of linear features formed at the interface between the viscoelastic lightguide and adjacent layers.
Figure 14B:
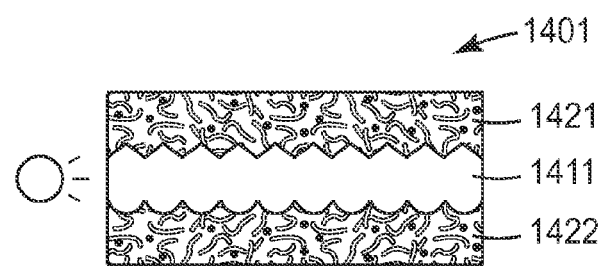
Figure 14C:
Figure 14D:
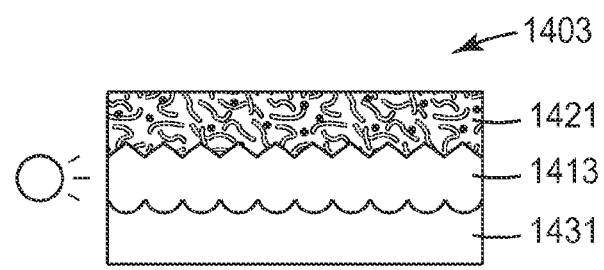
Figure 14E:
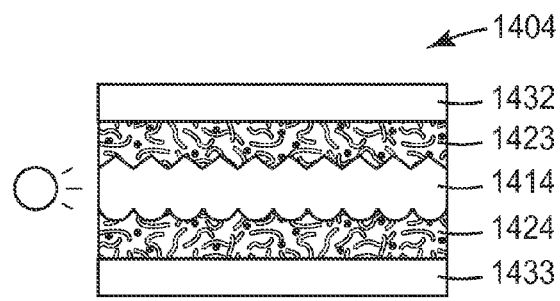

In FIG. 14*e*, illumination device 1404 comprises light source 50 optically coupled to viscoelastic lightguide 1414 which is an adhesive lightguide and is adhered to first and second nanovoided polymeric layers 1423 and 1424. First substrate 1432 is disposed on first nanovoided polymeric layer 1423 opposite the lightguide. Second substrate 1433 is an optically clear substrate and is disposed on second nanovoided polymeric layer 1424 opposite the lightguide.

Figure 14F:
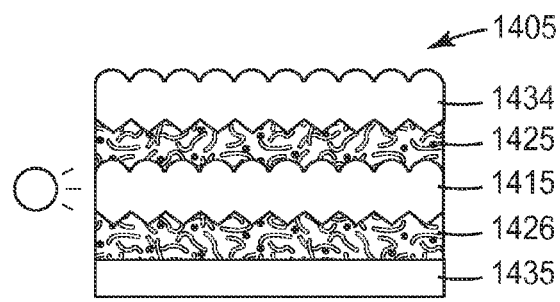

In FIG. 14*f*, illumination device 1405 comprises light source 50 optically coupled to viscoelastic lightguide 1415 which is an adhesive lightguide and is adhered to first and second nanovoided polymeric layers 1425 and 1426. First substrate 1434 is an optically clear substrate and is disposed on first nanovoided polymeric layer 1425 opposite the lightguide. Second substrate 1435 is disposed on second nanovoided polymeric layer 1426 opposite the lightguide.

Figure 15A:
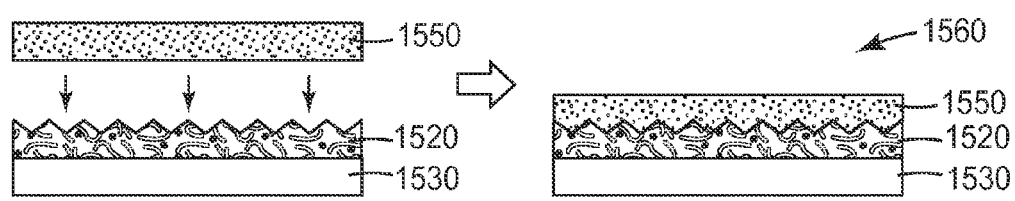
FIGS. 15a-15b show exemplary methods by which the optical articles disclosed herein can be made.
Figure 15B:
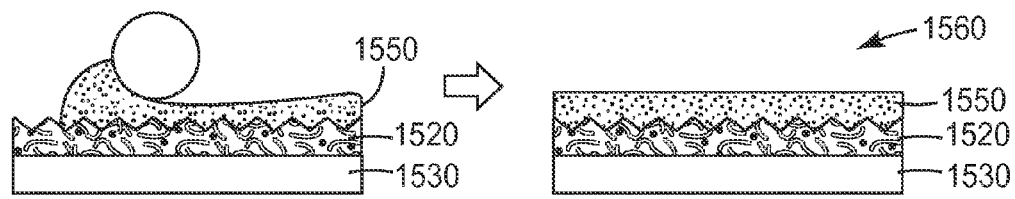

FIGS. 15*a*-15*b* show exemplary methods by which the optical articles disclosed herein can be made. In FIG. 15*a*, nanovoided polymeric layer 1520 is disposed on substrate 1530 and may or may not have been formed on the substrate. Optical article 1560 is formed by pressing transfer adhesive 1550 to the surface of the nanovoided polymeric layer, such that the adhesive conforms to a structured surface of the layer. The structured surface of the nanovoided polymeric layer may be substantially planar, i.e., unstructured. Optical article 1560 can be adhered to another component to make a new optical article such as any of those described above. In FIG. 15*b*, optical article 1560 is formed by coating an adhesive composition on a surface of the nanovoided polymeric layer, such that the adhesive composition conforms to a structured surface of the layer. The article with the adhesive composition on it may need to be processed further (e.g., curing, removing solvent, etc.) such that the composition forms a layer.

The invention may be more completely understood in consideration of the following examples.

EXAMPLES

Example I

1. Reactive Nanoparticles

In a 2 liter three-neck flask, equipped with a condenser and a thermometer, 960 grams of organosilica elongated particles (ORGANOSILICASOL IPA-ST-UP from Nissan Chemical Inc.), 19.2 grams of deionized water, and 350 grams of 1-methoxy-2-propanol were mixed under rapid stirring. The organosilica elongated particles were 9-15 nm with length 40-100 nm and were dispersed in a 15.2% wt. isopropanol (IPA). Next, 22.8 grams of 3-methacryloxypropyltrimethoxysilane (SILQUEST A-174 from Sartomer Co., Inc.) was added to the flask. The resulting mixture was stirred for 30 minutes.

The mixture was kept at 81° C. for 16 hours, and then allowed to cool to room temperature. Next, about 950 grams of solvent were removed from the solution using a rotary evaporator with a 40° C. water-bath, resulting in a 41.7% wt. A-174-modified elongated silica clear dispersion in 1-methoxy-2-propanol.

2. Coating Solution

A coating solution was made by first dissolving an aliphatic urethane diacrylate oligomer (CN 9893 from Sartomer Co., Inc.) in ethyl acetate under ultrasonic agitation. The following ingredients were then added with stirring to form a homogenous solution: pentaerythritol triacrylate (SR 444 from Sartomer Co., Inc.) and photoinitiators (IRGACURE 184 and 819 from Ciba Specialty Chemicals). The coating formulation is shown in Table 1.

TABLE 1

| Material | % Solids | Amount (g) |
|---|---|---|
| Modified A-174 Nanoparticles | 40.90 | 69.20 |
| CN 9893 | 100.00 | 5.70 |
| SR 444 | 100.00 | 22.60 |
| Ethyl acetate | 0 | 33.40 |
| IPA | 0 | 33.40 |
| IRGACURE 184 | 100.00 | 0.70 |
| IRGACURE 819 | 100.00 | 0.14 |
| Total | | 165.10 |

3. Microreplication Tools

Two types of microreplication tools were used to build the optical elements. The first tool type was a modified diamond turned metallic cylindrical tool with patterns cut into the copper surface of the tool using a precision diamond turning machine. The resulting copper cylinders with precision cut features were nickel plated and coated with PA11-4.

The second tool type was a film replicate from the precision cylindrical tool described above. An acrylate resin comprising acrylate monomers and a photoinitiator was cast onto a PET support film (2 mil) and then cured against a precision cylindrical tool using ultraviolet light. The surface of the resulting structured film was coated with a silane release agent (tetramethylsilane) using a plasma-enhanced chemical vapor deposition (PECVD) process. The surface-treated structured film was then used as a tool by wrapping and securing a piece of the film, structured side out, to the surface of a casting roll.

The tools used in the examples are summarized in Table 2.

TABLE 2

| Tool Name | Type | Feature Height (um) | Pitch (um) | Properties |
|---|---|---|---|---|
| Cylindrical lens 1 | Copper | 5.5 | 29.5 | concave linear array, 22.6 um radius |
| Cylindrical lens 2 | Film | 5.1 | 45.5 | convex linear array, 53.0 um radius |
| Linear prism 1 | Copper | 25.6 | 29.5 | linear array, 60° included angle |
| Linear prism 2 | Film | 2.9 | 81.6 | linear array, 172° included angle |
| Microlens array | Film | 11 | ~40 | convex hexagonal array |

4. Nanovoided Layer Microreplication

A film microreplication apparatus was employed to create microstructured nanovoided structures on a continuous film substrate. The apparatus comprised a means of applying the coating solution (a needle die and syringe pump), a cylindrical microreplication tool, a rubber nip roll against the tool, a series of UV-LED arrays arranged around the surface of the microreplication tool, and a web handling system to supply, tension, and take up the continuous film. The apparatus was configured to control a number of coating parameters manually including tool temperature, tool rotation, web speed, rubber nip roll/tool pressure, coating solution flow rate, and UV-LED irradiance. An example process is illustrated in FIG. 1 of U.S. Provisional Application No. 61/294,577 to Wolk et al. and filed Jan. 13, 2010.

The coating solution described in Table 1 was applied to a 3 mil PET film (DuPont MELINEX film primed on both sides) adjacent to the nip formed between the tool and the film. The flow rate of the solution was adjusted to ~0.25 ml/min and the web speed was set to 1 ft/min so that a continuous, rolling bank of solution was maintained at the nip.

In one example, 3M™ Enhanced Specular Reflector (3M ESR) film was used as the substrate, wherein sheeted samples of the ESR film were attached to a PET carrier film as the film moved through the line. The primed ESR film was attached with primed side out onto continuous web of 3-mil DuPont MELINEX two sided primed film using removable adhesive tape.

Although ESR is a reflective film, the reflectivity is decreased when it is in contact with a fluid (e.g. the dispersion) and when light is incident at high angles. Both of these conditions were met during the micreplication process, allowing for at least partial cure of the coating solution through the ESR film as it wrapped around the cylindrical microreplication tool.

The UV-LED bank being 8 rows of 16 LEDs (Nichia NCCU001, peak wavelength=385 nm) were set by adjusting the device current to 6 amps at 100 V. The irradiance was uncalibrated. The coating solution was cured with the solvent present as the film and tool rotated past the banks of UV-LEDs, forming microreplicated nanoporous structure arrays corresponding to the negative of the tool structure.

The structured film was separated from the tool and collected on a take-up roll. In some cases, the microstructured coating was further cured (post-process curing) by UV radiation to improve the mechanical characteristics of the coating. The post-process curing was accomplished using a Fusion Systems Model I300P fitted with an H-bulb. The UV chamber was nitrogen-inerted to approximately 50 ppm oxygen.

Microstructured nanovoided films made by the above process are summarized in Table 3.

TABLE 3

| Microstructured Nanovoided Film | Microstructured Surface | Substrate |
|---|---|---|
| A | Cylindrical lens 1 | PET |
| B | Cylindrical lens 2 | PET |
| C | Linear prism 1 | PET |
| D | Linear prism 2 | PET |
| E | Linear prism 2 | 3M ESR |
| F | Microlens array | PET |

5. Lamination of Transfer Adhesive to Microstructured Nanovoided Films

For each microstructured nanovoided film, transfer adhesive (SOKEN 1885, Soken Chemical & Engineering Co., Ltd, Japan, cast as a 1 mil thick film between two liners) was laminated to the microstructured surface using light pressure and a hand roller. For each film, the result was adhesive-sealed microstructured nanovoided film in which the embedded surface of the adhesive had a structure imparted to it by the microstructured surface of the microstructured nanovoided film.

6. Solventborne Backfills of Microstructured Nanovoided Films

Three solventborne formulations were used to backfill the microstructured nanovoided films:

a. High Viscosity Resin 1

A solution of 10% wt. of polyvinyl butyral acrylate resin (BUTVAR B-98 from Solutia Inc.) and 1% IRGACURE 819 in methylethylketone was used to overcoat a microstructured nanovoided film comprising inverted cylindrical lenses, dried in an oven at 100° C. for 1 minute, and then put through a UV processor (Fusion UV-Light Hammer 6 with H bulb, RPC Industries Model Number I6P1/LH Serial Number 1098) at 30 feet per minute under nitrogen for 2 passes.

b. High Viscosity Resin 2

A solution of 10% wt. of polyvinyl butyral acrylate resin (BUTVAR B-76 from Solutia Inc.) in IPA was used to overcoat a microstructured nanovoided film comprising inverted cylindrical lenses using coating rod #24 and dried in oven at 100° C. for 1 minute.

c. Optically Clear Adhesive

A solution of 27% wt. of a PSA consisting of iso-octyl acrylate and acrylic acid (93:7) in ethyl acetate/heptane (60:40) was used to overcoat a microstructured nanovoided film comprising inverted cylindrical lenses using coating rod #24 and dried in oven at 100° C. for 1 minute. A PET substrate was laminated using light pressure and a hand roller.

7. Fabrication of Backlight Assembly A

Backlight Assembly A was prepared as follows. Samples of Microstructured Nanovoided Films B and D were each laminated with a layer of transfer adhesive (Soken 1885) using light pressure and a hand roller. An adhesive lightguide was constructed using four layers of an optically clear acrylic PSA (3M™ Optically Clear Laminating Adhesive 8187 from 3M Company) laminated together making a 28 mil thick body. The refractive index of the optically clear acrylic PSA was 1.47. Microstructured Nanovoided Film B was laminated to a major surface of the adhesive lightguide such that the transfer adhesive was in contact with the lightguide. Microstructured Nanovoided Film D was laminated to an opposing major surface of the adhesive lightguide such that the transfer adhesive was in contact with the lightguide and the linear prisms were oriented 90° to the cylindrical lenses. The assembly is shown in FIG. 12a.

The desired size was then marked on the lightguide (79.0 mm×40.7 mm) which was then brought to low temperature (<0° C.) before cutting. Low temperature cutting helps create a better optical edge for light injection. After being brought to a low temperature, the lightguide was cut out using a hand held rotary cutter which also preserves the optical edge by providing a clean and vertical cut.

The completed lightguide was then mated with sixteen (8 per side) NSSW006T LEDs from Nichia Corp. in a 3D demonstration unit, which allowed for viewing and analysis in a fully functioning 3D display.

8. Analysis of Lightguide Performance for Backlight Assembly A

Figure 20:
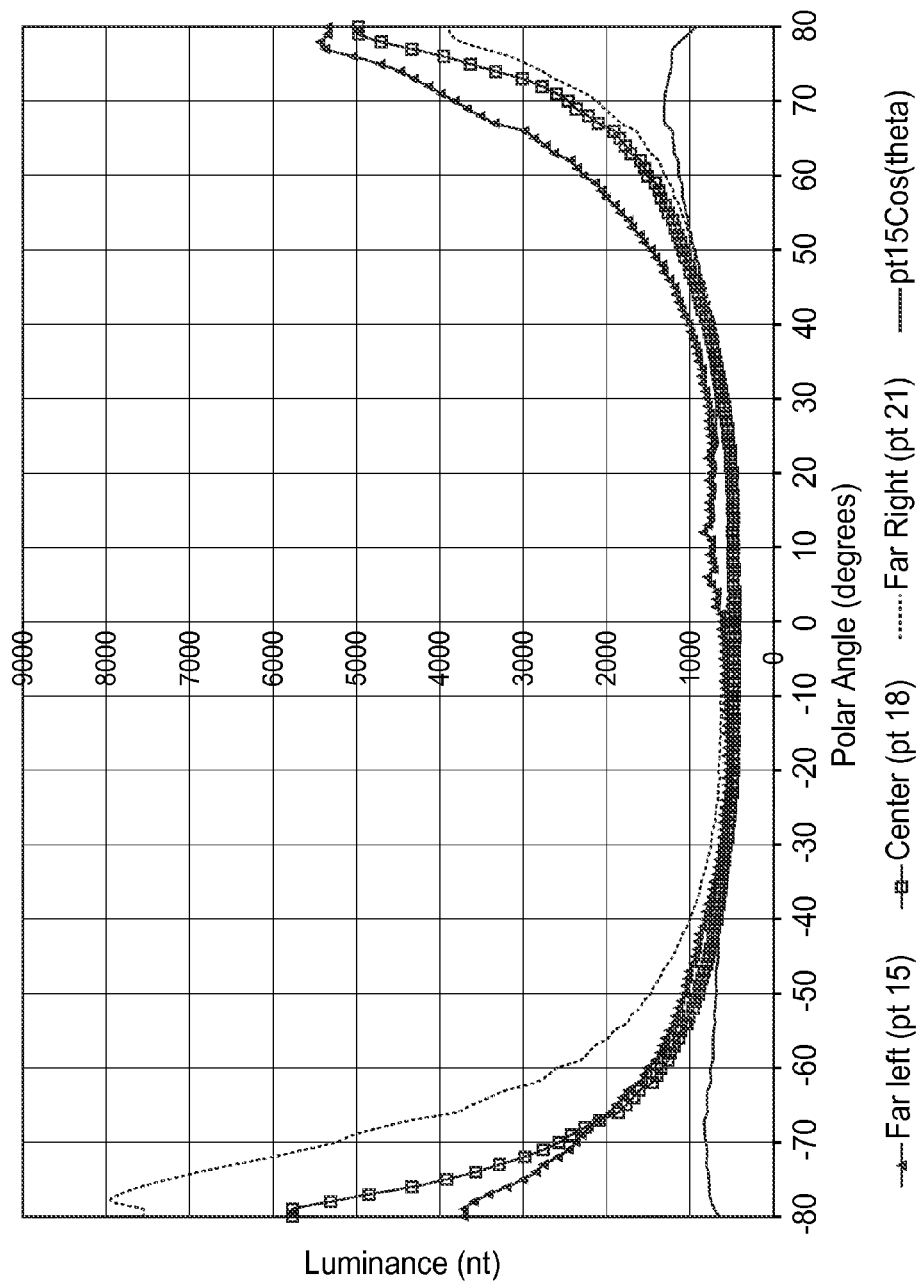

Performance of Backlight Assembly A was measured using an Autronic Conoscope configured to measure luminance at far left, center and far right positions in a line horizontally down the center of the lightguide. The data (luminance versus azimuthal angle) are shown in FIG. 20.

9. Fabrication of Backlight Assemblies B-D

Backlight Assembly B could be prepared as described above for Backlight Assembly A, using Microstructured Nanovoided Film E instead of Film D. Backlight Assembly C could be prepared as described above for Backlight Assembly A, using an acrylic slab in place of the PSA strips. The acrylic slab could be machined to dimensions of about 79 mm×40.7 mm×0.762 mm with at least one optical quality edge. Backlight Assembly D could be prepared as described for Backlight Assembly C, using Microstructured Nanovoided Film E instead of Film D.

Example II

Example 1

Adhesive Lightguide HABL with Embedded Extraction Wedges and Integral Reflector

Illumination device 1300 shown in FIG. 13a comprises microreplicated optical resin film 1340 laminated to viscoelastic lightguide 1310. Nanovoided polymeric layer 1320 comprises a microreplicated ultra low index film that functions as an optical isolation layer so that a mirror such as multilayer optical film 3M™ ESR Film can be used as a support film. The mirror, usually configured as a free standing sheet on the rear of the device, recycles light that leaks through the bottom surface. Another feature of this embodiment is the embedded extraction prism array, which is protected from abrasion.

Example 2

Adhesive Lightguide HABL with Embedded Cylindrical Lenses

Illumination device 1301 shown in FIG. 13b comprises microreplicated ultra low index film 1321 laminated to viscoelastic lightguide 1311. Substrate 1331 comprises a microreplicated optical resin film. A feature of this embodiment is the embedded cylindrical lens array, which is protected from abrasion and may allow for the direct lamination of the guide to an adjacent surface.

Example 3

Adhesive Lightguide HABL with Major Planar Surfaces

This example is a hybrid of Examples 1 and 2. Illumination device 1404 shown in FIG. 14e comprises top and bottom surfaces each laminated with a microreplicated ultra low index film. A feature of this embodiment is the embedding of both the cylindrical lens array and the extraction prism array, which are protected from abrasion and may allow for the direct lamination of the guide to adjacent surfaces. Substrate 1433 comprises a microreplicated optical resin film, and substrate 1432 comprises a mirror such as multilayer optical film 3M™ ESR Film.

Example 4

Integrated 3D Film and HABL Assembly

This example is an extension of Example 3 which incorporates another element of a 3D display, a double-sided prism film. Illumination device 1405 shown in FIG. 14f comprises top and bottom surfaces each laminated with a microreplicated ultra low index film. The structure on the top surface is imparted directly on turning film 1434 in a process step that both forms the structure and planarizes the underlying turning prisms. Substrate 1435 comprises a mirror such as multilayer optical film 3M™ ESR Film. A feature of this embodiment is the integration of what is currently three separate pieces—the turning film, the lightguide, and the mirror film—into a single assembly.

Example 5

Integrated 3D Film and HABL Assembly

This example of a backlight with two structured optical surfaces is an alternative to the adhesive lightguide structure of the previous examples. Instead, a conventional solid lightguide (e.g. high clarity acrylic or polycarbonate) is used. Illumination device 1201 shown in FIG. 12*b* comprises a top surface from a laminated microreplicated optical resin film 1232 and the bottom comprises a microreplicated ultra low index film 1222. Both of these are laminated to the solid lightguide using first and second transfer adhesive layers 1252 and 1253, respectively. In this case, the adhesive is also molded into an extraction prism array by the structured ultra low index coating on the bottom support film 1233. Substrate 1233 comprises a mirror such as multilayer optical film 3M™ ESR Film.

Example 6

Integrated 3D Film and HABL Assembly

This example is an extension of the illumination device described for Example 2 in which the optical article of Example 2 is bonded to a modified 3D turning film (double sided prism film described above for FIG. 13*c*). A fraction of the turning film prism array tips have been modified with standoffs so that the 3D film can be bonded directly to the lightguide using a transfer adhesive.

Example 7

Hybrid PSA and Acrylic Sheet Lightguide

A prototype hybrid lightguide for a 9" diagonal display was made starting with a 3/32" thick acrylic substrate for a lightguide with target thickness of ~0.125". Sheets of 0.014" thick adhesive were made by laminating two sheets of commercially available 0.007" thick PSA (3M™ Optically Clear Adhesive 8187). One 0.014" thick layer of adhesive was then laminated to each side of the acrylic lightguide substrate, which gave a total lightguide thickness of ~0.122". A lenticular film having lenticular features on one side was laminated to the top surface of the lightguide. The lenticular features ranged from 35.6 um radius full half rounds spaced at 72.6 um to 54 um radius lenses spaced at 45.5 um which were not full half rounds. A prismatic film having prism features on one side was laminated to the bottom surface of the lightguide. The prism features were 2.9 um tall spaced at 81.6 um intervals with a rise angle of 4 degrees.

The lightguide was used in a backlight for a 9" diagonal LCD device. The backlight consisted of two light engines, each with 6 LEDs (Cree XP-E), a backplane with back reflector (ESR) and 3D film attached to an aluminum frame.

Figure 16A:
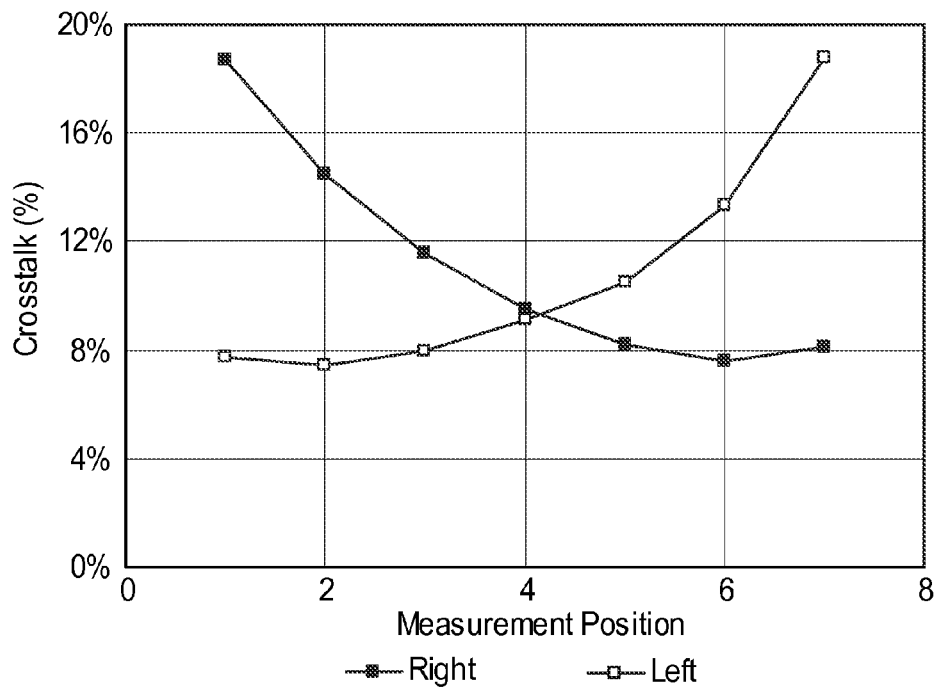
FIGS. 16a-16b, 17a-17b, 18a-18b, 19a-19b and 20 show data from exemplary illumination devices.

The performance of the backlight with respect to crosstalk as a function of horizontal location along the backlight was measured with a ConoScope. FIG. 16*a* shows results with right and left light sources on. Measurement positions are along the lightguide. Crosstalk is a measure of the amount of light that enters a viewer's eye of which it is not intended when either the left or right LED source is on.

Figure 16B:
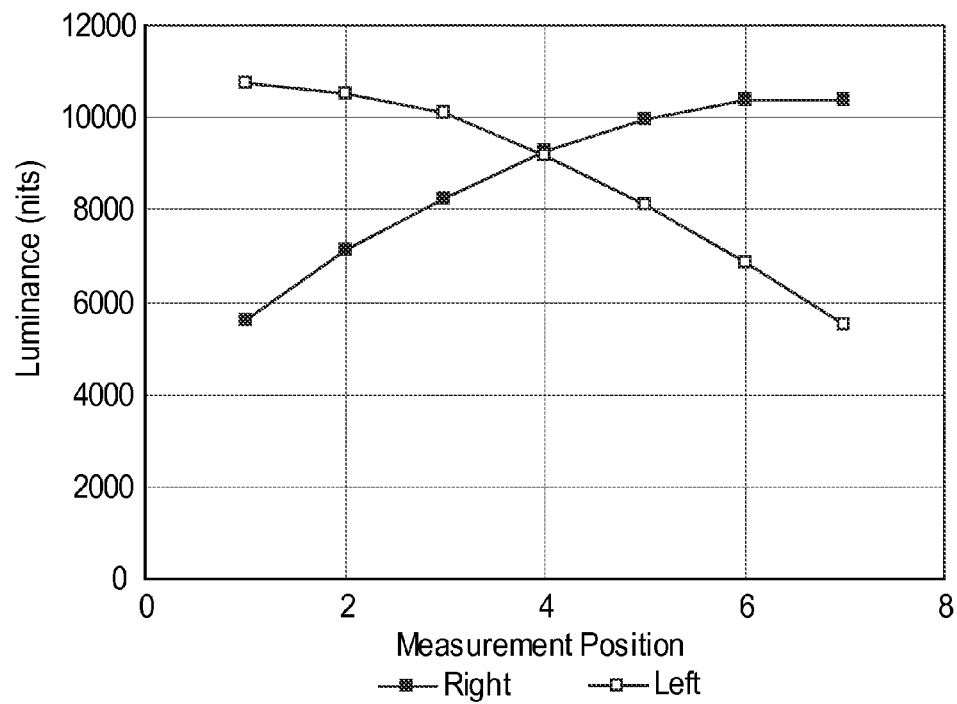

The performance of the backlight with respect to uniformity as a function of horizontal location along the backlight was measured with a ConoScope. FIG. 16*b* shows results with right and left light sources on. Measurement positions are along the lightguide. The luminance indicates uniformity of luminance versus screen position and shows the output intensity of the backlight at various positions when either the left or right LED source is on.

Example 8

PSA-Based Lightguides

An optical article similar to that of Example 7 was made for a 9" diagonal display. Due to the increased size, the thickness of the PSA was increased to maintain luminance uniformity across the width of the backlight. Lightguides of this size were made starting with a 0.100" thick sheet of cell cast acrylic and laminating the lenticular and prismatic films of Example 7 to the acrylic sheet with 0.0035" thick PSA (3M™ Optically Clear Adhesive 8187). This made a total lightguide thickness (acrylic+2 adhesive layers) of 0.107". Another lightguide was prepared by replacing the acrylic sheet with a single sheet of 0.08" thick clear VHB™ Acrylic Tape 4918 from 3M Company to make a 0.108" thick lightguide.

Figure 17A:
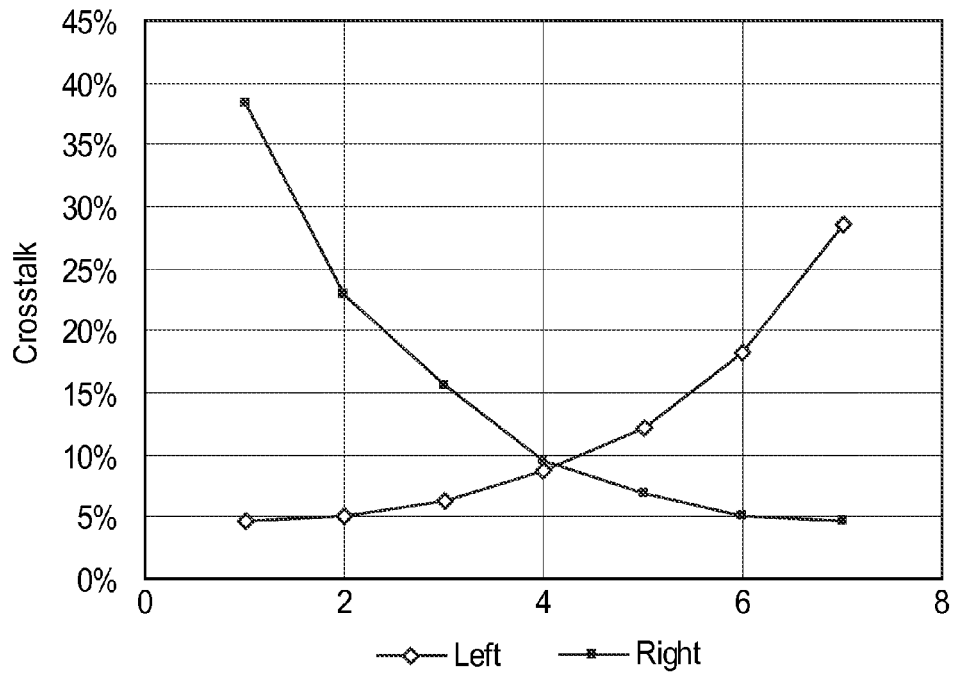
Figure 17B:
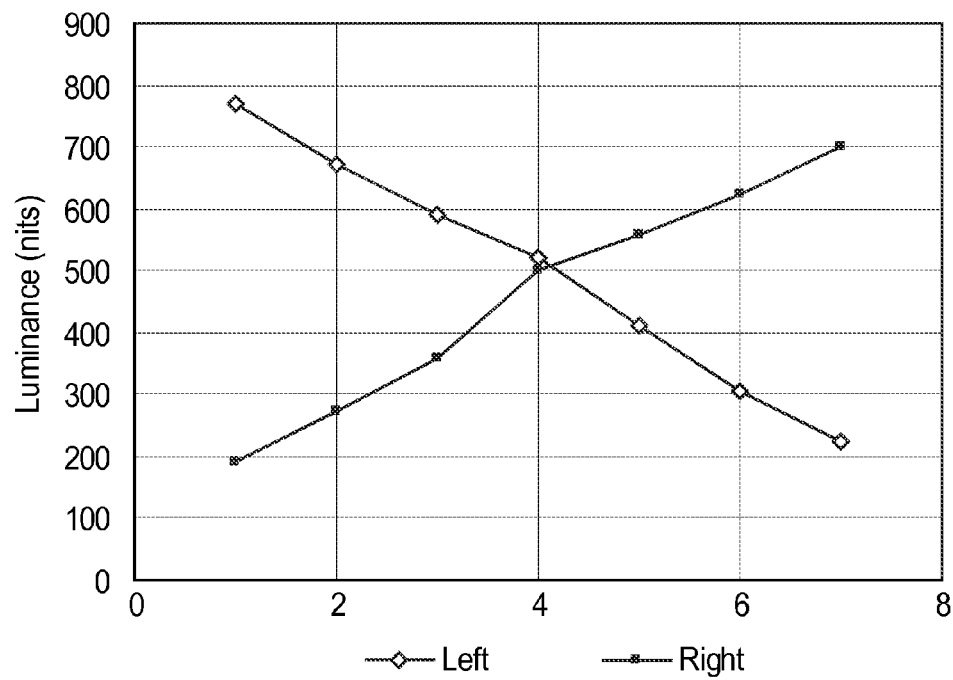
Figure 18A:
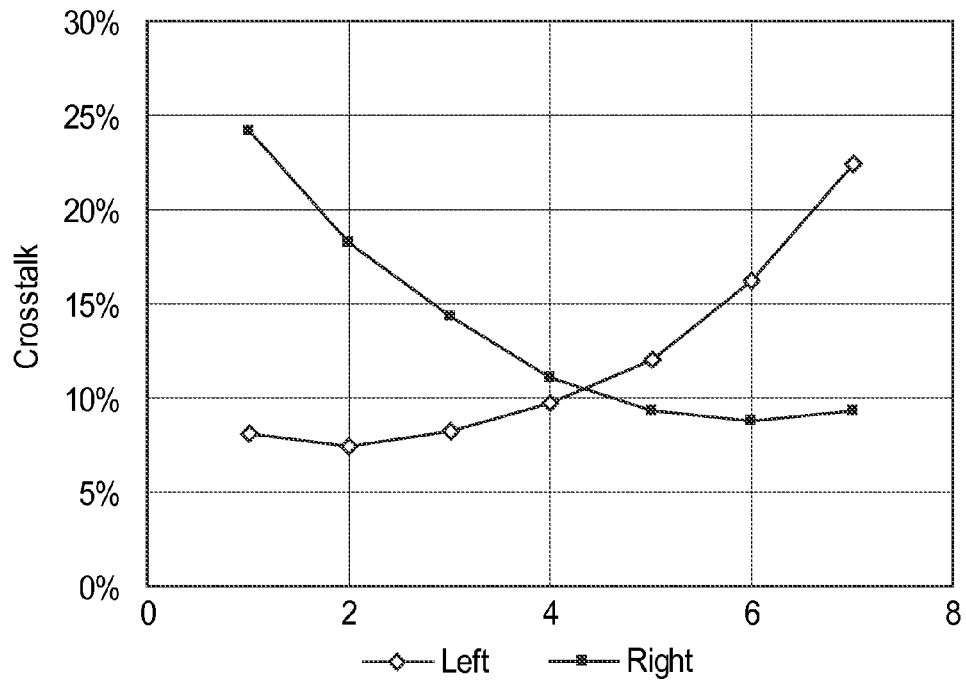
Figure 18B:
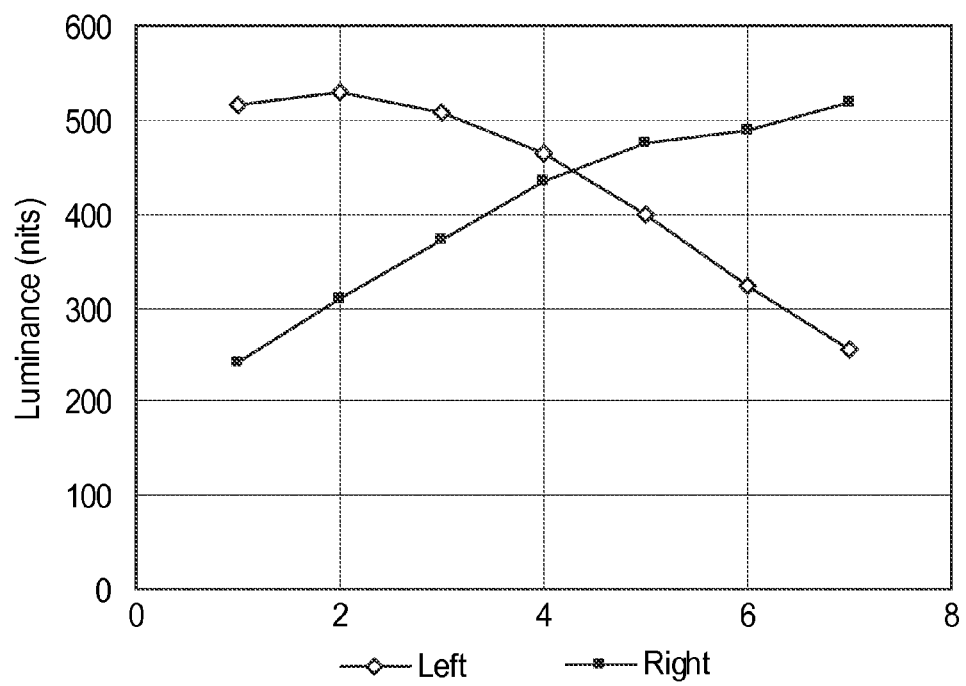

The performance of each backlight with respect to crosstalk and uniformity was measured as described above for Example 7. Results are shown in FIGS. 17*a* and 17*b* for the lightguide comprising the cell cast acrylic, and in FIGS. 18*a* and 18*b* for the lightguide comprising the VHB™ tape.

Example 9

PSA-Based Lightguides

Figure 19A:
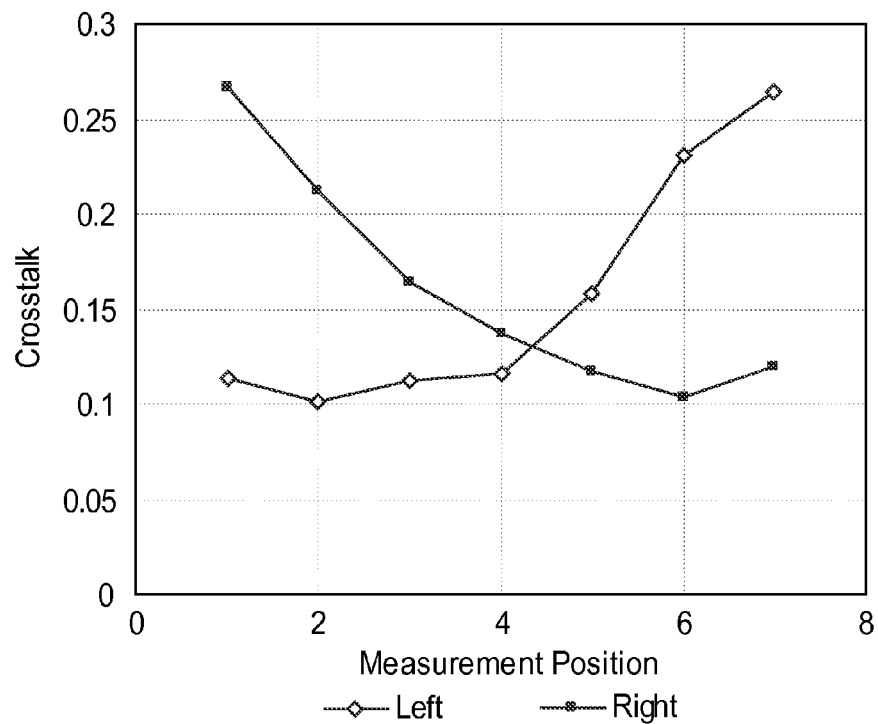
Figure 19B:
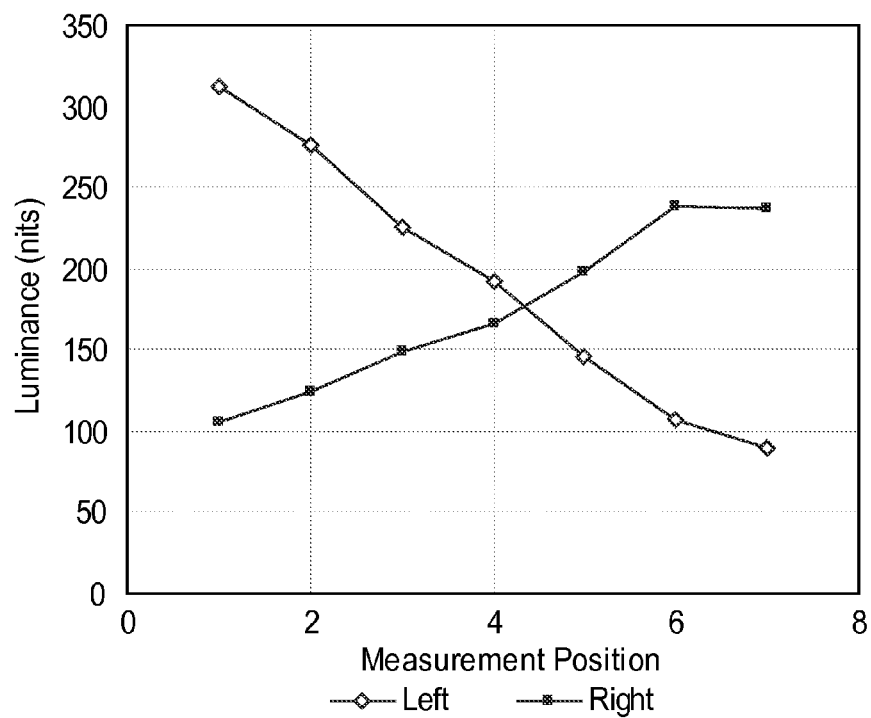

A prototype PSA-based lightguide for a 3" diagonal display was made using three layers of 0.007" thick optically clear adhesive as the lightguide (0.021" total lightguide thickness). Lenticular and extractor films of Example 7 were laminated to the top and bottom surfaces, respectively, of the adhesive. The finished lightguide had a total thickness of ~0.041". The performance of the backlight with respect to crosstalk and uniformity was measured as described above for Example 7. Results are shown in FIGS. 19*a* and 19*b*.

What is claimed is:

1. An illumination device comprising:
   an optical article comprising:
      a nanovoided polymeric layer disposed between a viscoelastic lightguide and a substrate, the nanovoided polymeric layer comprising a plurality of interconnected nanovoids,
      a first interface formed between the nanovoided polymeric layer and the viscoelastic lightguide, the first interface comprising a plurality of first features, and
      a second interface formed between the nanovoided polymeric layer and the substrate, the second interface comprising a plurality of second features; and
   a light source optically coupled to the viscoelastic lightguide such that light emitted by the light source enters the viscoelastic lightguide and is transported within the lightguide by total internal reflection.

2. The illumination device of claim 1, wherein the optical article comprises opposing outer surfaces, each outer surface not comprising a plurality of features.

3. The illumination device of claim 1, the substrate comprising a multilayer optical film.

4. The illumination device of claim 1, wherein the substrate comprises a light transmissive substrate.

5. The illumination device of claim 1, wherein the substrate extracts and emits light being transported within the viscoelastic lightguide.

6. The illumination device of claim 1, wherein the interconnected nanovoids have an average size of less than about 0.7 microns.

7. The illumination device of claim 1, wherein the nanovoided polymeric layer has an effective index of refraction of from about 1.15 to about 1.45.

8. An illumination device comprising:
an optical article comprising a viscoelastic lightguide disposed on a nanovoided polymeric layer, the nanovoided polymeric layer comprising a plurality of interconnected nanovoids, the interface formed between the viscoelastic lightguide and the nanovoided polymeric layer comprising a plurality of first features, and a surface of the viscoelastic lightguide opposing the interface comprising a plurality of second features; and
a light source optically coupled to the viscoelastic lightguide such that light emitted by the light source enters the viscoelastic lightguide and is transported within the lightguide by total internal reflection.

9. The illumination device of claim 8, wherein either the first or second features reflect light being transported within the viscoelastic lightguide, and the other of the first or second features extract light being transported within the viscoelastic lightguide.

10. The illumination device of claim 8, wherein the interconnected nanovoids have an average size of less than about 0.7 microns.

11. The illumination device of claim 8, wherein the nanovoided polymeric layer has an effective index of refraction of from about 1.15 to about 1.45.

12. An illumination device comprising:
an optical article comprising a viscoelastic lightguide disposed between first and second nanovoided polymeric layers, the first nanovoided polymeric layer comprising a plurality of first interconnected nanovoids, the second nanovoided polymeric layer comprising a plurality of second interconnected nanovoids, a first interface formed between the viscoelastic lightguide and the first nanovoided polymeric layer comprising a plurality of first features, and a second interface formed between the viscoelastic lightguide and the second nanovoided polymeric layer comprising a plurality of second features; and
a light source optically coupled to the viscoelastic lightguide such that light emitted by the light source enters the viscoelastic lightguide and is transported within the lightguide by total internal reflection.

13. The illumination device of claim 12, wherein either the first or the second features reflect light being transported within the viscoelastic lightguide, and the other of the first or second features extract light being transported within the viscoelastic lightguide.

14. The illumination device of claim 12, wherein the first and second interconnected nanovoids each have an average size of less than about 0.7 microns.

15. The illumination device of claim 12, wherein the first and second nanovoided polymeric layers each have an effective index of refraction of from about 1.15 to about 1.45.

16. An illumination device comprising:
an optical article comprising
a viscoelastic lightguide, and
a nanovoided polymeric layer disposed on the viscoelastic lightguide, the nanovoided polymeric layer comprising a plurality of interconnected nanovoids; and
a light source optically coupled to the viscoelastic lightguide such that light emitted by the light source enters the viscoelastic lightguide and is transported within the lightguide by total internal reflection, wherein the nanovoided polymeric layer comprises a binder and a plurality of nanoparticles, wherein a weight ratio of the binder to the plurality of nanoparticles is greater than about 1:2, and a volume fraction of the interconnected nanovoids in the nanovoided polymeric layer is not less than about 20%.

17. The illumination device of claim 16, wherein the nanoparticles comprise reactive groups that are chemically bound to the binder.

18. The illumination device of claim 16, wherein the nanoparticles are not chemically bound to the binder.

19. The illumination device of claim 16, wherein the nanoparticles comprise elongated particles having an average aspect ratio that is not less than about 2.

20. The illumination device of claim 16, wherein the nanoparticles comprise spherical particles.

21. The illumination device of claim 16, wherein a weight ratio of the binder to the plurality of nanoparticles ranges from about 30:70 to about 90:10.

22. The illumination device of claim 16, wherein the binder is crosslinked.

23. The illumination device of claim 16, wherein the binder comprises a multifunctional (meth)acrylate and a urethane oligomer.

24. The illumination device of claim 16, wherein the nanovoided polymeric layer has a thickness of less than about 5 microns.

25. The illumination device of claim 16, wherein the viscoelastic lightguide comprises a pressure sensitive adhesive.

26. The illumination device of claim 16, wherein the optical article further comprises an adhesive layer disposed on the nanovoided polymeric layer opposite the viscoelastic lightguide.

* * * * *